United States Patent
Shahana et al.

(10) Patent No.: US 11,840,316 B2
(45) Date of Patent: Dec. 12, 2023

(54) CONTROL DEVICE FOR HUMAN-POWERED VEHICLE

(71) Applicant: Shimano Inc., Osaka (JP)

(72) Inventors: Satoshi Shahana, Osaka (JP); Mitsuhiko Kawasaki, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 253 days.

(21) Appl. No.: 16/901,554

(22) Filed: Jun. 15, 2020

(65) Prior Publication Data

US 2020/0407015 A1    Dec. 31, 2020

(30) Foreign Application Priority Data

Jun. 27, 2019 (JP) ................. 2019-119514

(51) Int. Cl.
| | |
|---|---|
| *B62M 9/04* | (2006.01) |
| *B62M 9/122* | (2010.01) |
| *B62J 43/20* | (2020.01) |
| *B62M 6/45* | (2010.01) |
| *B62J 1/08* | (2006.01) |
| *B62M 6/50* | (2010.01) |
| *B62K 25/04* | (2006.01) |

(52) U.S. Cl.
CPC ............. *B62M 9/122* (2013.01); *B62J 1/08* (2013.01); *B62K 25/04* (2013.01); *B62M 6/45* (2013.01); *B62M 6/50* (2013.01); *B62J 2001/085* (2013.01); *B62K 2025/044* (2013.01)

(58) Field of Classification Search
CPC ........ B62M 9/06; B62M 9/121; B62M 9/122; B62M 9/131; B62M 9/132; B62M 6/40; B62M 6/45; B62M 6/50; B62M 9/04; B62M 25/02; B62K 25/04; B62S 1/08
See application file for complete search history.

(56) References Cited

U.S. PATENT DOCUMENTS 5,728,017 A * 3/1998 Bellio ................. B62M 9/12
474/70
5,922,035 A  7/1999 Chen

FOREIGN PATENT DOCUMENTS

| | | | |
|---|---|---|---|
| DE | 101 53 487 A1 | 5/2003 | |
| EP | 0786400 B1 * | 11/2003 | ............ B62M 25/08 |
| JP | 10-511621 A | 11/1998 | |
| WO | 2016/039197 A1 | 3/2016 | |

* cited by examiner

*Primary Examiner* — Blane J Jackson
(74) *Attorney, Agent, or Firm* — Global IP Counselors, LLP

(57) ABSTRACT

To provide a human-powered vehicle control device configured to perform shifting in accordance with situations, a control device is configured to control a transmission of a human-powered vehicle. The control device comprises an electronic controller configured to control the transmission. The electronic controller includes at least one shifting condition for actuating the transmission to shift a transmission ratio. The electronic controller holds the shifting condition that is related with riding-related information of the human-powered vehicle in a case where the human-powered vehicle is in a riding convergence state.

20 Claims, 13 Drawing Sheets

| Item | Content | Value | | |
|---|---|---|---|---|
| Riding Information | Torque | Large | Medium | Small |
| Device Setting Information | Seat Height | High | Middle | Low |
| Body Information | Heart Rate | Normal | Low | High |
| Environment Information | Road Gradient | Flat | Up | Down |

Fig.9

| Speed Stage (Transmission Ratio) | | Riding Information | Device Setting Information | Body Information | Environment Information | Condition Set of Shifting and Changing Conditions |
|---|---|---|---|---|---|---|
| | | Torque | Seat Height | Heart Rate | Road Gradient | |
| 1 | Riding-Related Information CX2 | Large | Middle | Normal | Flat | 1st Threshold Value AA01<br>2nd Threshold Value AA02<br>1st Converging Threshold Value AA03<br>2nd Converging Threshold Value AA04 |
| 1 | Riding-Related Information CX3 | Large | Middle | Normal | Up | 1st Threshold Value AA05<br>2nd Threshold Value AA06<br>1st Converging Threshold Value AA07<br>2nd Converging Threshold Value AA08 |

Fig.10

| Speed Stage (Transmission Ratio) | Initial | Riding-Related Information CX2<br>Riding Information: Large<br>Device Setting Information: Middle<br>Body Information: Normal<br>Environment Information: Flat | Riding-Related Information CX3<br>Riding Information: Large<br>Device Setting Information: Middle<br>Body Information: Normal<br>Environment Information: Up | ... | ... | ... |
|---|---|---|---|---|---|---|
| 1 | CX1 (AA01~AA04) | CX2 (AA01~AA04) | CX3 (AA05~AA08) | ... | ... | ... |
| 2 | CX1 (BA01~BA04) | CX2 (BA01~BA04) | — | ... | ... | ... |
| 3 | CX1 (CA01~CA04) | CX2 (CA01~CA04) | CX3 (CA05~CA08) | ... | ... | ... |
| 4 | CX1 (DA01~DA04) | CX2 (DA01~DA04) | — | ... | ... | ... |
| ... | | | | | | |

Fig.11

CONTROL DEVICE FOR HUMAN-POWERED VEHICLE

CROSS-REFERENCE TO RELATED APPLICATIONS

This application claims priority to Japanese Patent Application No. 2019-119514, filed on Jun. 27, 2019. The entire disclosure of Japanese Patent Application No. 2019-119514 is hereby incorporated herein by reference.

BACKGROUND

Technical Field

The present invention generally relates to a control device for a human-powered vehicle.

Background Information

A transmission system that controls a transmission of a human-powered vehicle is known. A typical transmission system automatically changes the transmission ratio. Japanese National Phase Laid-Open Patent Publication No. 10-511621 describes a technique that controls a transmission based on the condition of the rider calculated from the speed and the transmission ratio.

SUMMARY

Shifting conditions are predetermined in a human-powered vehicle. In a case where the human-powered vehicle is stably traveling and the transmission ratio is maintained at one of the values, comfortable cadence varies depending on various factors such as preferences of the user and the environment surrounding the human-powered vehicle. In a case where shifting is performed based on the typical predetermined shifting conditions, the shifting can be unsuitable for the user. Therefore, a proposed control device for a human-powered vehicle is configured to perform shifting in accordance with situations.

A control device in accordance with a first aspect of the present disclosure is configured to control a transmission of a human-powered vehicle. The control device comprises an electronic controller configured to control the transmission. The electronic controller includes at least one shifting condition configured to actuate the transmission to shift a transmission ratio. The electronic controller is configured to hold the at least one shifting condition that is associated with riding-related information of the human-powered vehicle upon determining the human-powered vehicle is in a riding convergence state.

The control device for a human-powered vehicle according to the first aspect holds the shifting condition that is related with riding-related information of the human-powered vehicle in a case where the human-powered vehicle is in a riding convergence state. This allows shifting to be performed in accordance with situations. For example, shifting can be performed in accordance with the user. Also, shifting can be performed in accordance with a riding state.

In accordance with a second aspect of the present disclosure, the control device according to the first aspect is configured so that the electronic controller is configured to use a first shifting condition of the at least one shifting condition for a first transmission ratio and a second shifting condition of the at least one shifting condition for a second transmission ratio, the first shifting condition differs from the second shifting condition.

With the control device according to the second aspect, the shifting condition can be set appropriately to each transmission ratio.

In accordance with a third aspect of the present disclosure, the control device according to the first or second aspect is configured so that the electronic controller is configured to determine whether a changing condition is satisfied for changing the at least one shifting condition. The changing condition is satisfied upon determining riding information of the human-powered vehicle does not satisfy a predetermined reference while the human-powered vehicle is in the riding convergence state.

With the control device according to the third aspect, the shifting condition is changed in a case where the human-powered vehicle is in a riding convergence state and the riding differs from riding such that the riding information satisfies the predetermined reference.

In accordance with a fourth aspect of the present disclosure, the control device according to the third aspect is configured so that in a case where the electronic controller is configured to obtain the riding-related information related to a state of changing the at least one shifting condition, and to store the riding-related information and a changed in the at least one shifting condition in association with each other in storage, upon determining the changing condition is satisfied, and when changing the at least one shifting condition.

The control device according to the fourth aspect learns a situation in which the shifting condition is changed.

In accordance with a fifth aspect of the present disclosure, the control device according to the fourth aspect is configured so that the electronic controller is configured to change the at least one shifting condition prior to changing to the at least one shifting condition associated with the riding-related information, upon determining the riding-related information that is obtained from the human-powered vehicle and a device related with the human-powered vehicle matches the riding-related information obtained from the storage.

The control device according to the fifth aspect changes the shifting condition in an appropriate situation determined based on learned information. Thus, the riding is performed at a transmission ratio appropriate to the situations.

In accordance with a sixth aspect of the present disclosure, the control device according to the fifth aspect is configured so that the at least one shifting condition includes a plurality of shifting conditions are stored in association with the riding-related information, the electronic controller is configured to calculate a new shifting condition based on the plurality of shifting conditions and change a current one of the plurality of shifting conditions prior to changing to the new shifting condition.

With the control device according to the sixth aspect, the plurality of shifting conditions allows the shifting condition to be smoothly changed.

In accordance with a seventh aspect of the present disclosure, the control device according to any one of the third to sixth aspects is configured so that the riding-related information is at least one of riding information of the human-powered vehicle, a device setting information of the human-powered vehicle, a body information of a user of the human-powered vehicle, and environment information of an environment of the human-powered vehicle.

With the control device according to the seventh aspect, a situation in which the shifting condition is changed is specified based on the above information.

In accordance with an eighth aspect of the present disclosure, the control device according to any one of the third to seventh aspects is configured so that the predetermined reference includes a predetermined reference range from which a value is taken by the riding information of the human-powered vehicle while the human-powered vehicle is in a riding convergence state. The changing condition is satisfied where a converging value of the riding information takes a value outside the predetermined reference range in while the human-powered vehicle is in the riding convergence state.

With the control device according to the eighth aspect, whether the changing condition is satisfied is determined by a simple calculation.

In accordance with a ninth aspect of the present disclosure, the control device according to any one of the third to eighth aspects is configured so that the predetermined reference includes a predetermined reference range from which a value is taken by the riding information of the human-powered vehicle while the human-powered vehicle is in the riding convergence state. The changing condition is satisfied where the riding information continuously takes a value outside the predetermined reference range over a predetermined period while the human-powered vehicle is in the riding convergence state.

With the control device according to the ninth aspect, whether the changing condition is satisfied is appropriately determined even in a case where the riding information largely varies.

In accordance with a tenth aspect of the present disclosure, the control device according to any one of the third to ninth aspects is configured so that the predetermined reference includes a predetermined reference range from which a value is taken by the riding information of the human-powered vehicle while the human-powered vehicle is in the riding convergence state. The changing condition is satisfied where a length of time in which the riding information takes a value outside the predetermined reference range during a predetermined period is greater than a length of time in which the riding information takes a value inside the predetermined reference range while the human-powered vehicle is in the riding convergence state.

With the control device according to the tenth aspect, whether the changing condition is satisfied is determined based on the length of time in which the riding information takes a value outside the predetermined reference range during the predetermined period. Thus, the accuracy of a change is increased, that is, the change is appropriate to the riding.

In accordance with an eleventh aspect of the present disclosure, the control device according to any one of the third to tenth aspects is configured so that the predetermined reference includes a predetermined reference range from which a value is taken by the riding information of the human-powered vehicle while the human-powered vehicle is in the riding convergence state. The electronic controller is configured to change the at least one shifting condition to increase a median value of the at least one shifting condition if the riding information takes a value corresponding to a momentum that is greater than a momentum corresponding to a state where the riding information is in the predetermined reference range while the human-powered vehicle is in the riding convergence state. The electronic controller is configured to change the at least one shifting condition to decrease the median value of the at least one shifting condition if the riding information takes a value corresponding to a momentum that is less than a momentum corresponding to a state where the riding information is in the predetermined range.

The control device according to the eleventh aspect changes the shifting condition prior to changing to the shifting condition corresponding to a momentum in the riding convergence state.

In accordance with a twelfth aspect of the present disclosure, the control device according to any one of the third to eleventh aspects is configured so that the at least one shifting condition includes a first threshold value for the riding information of the human-powered vehicle and a second threshold value that is lower than the first threshold value.

With the control device according to the twelfth aspect, the condition is easy to compare. This decreases the load on the electronic controller.

In accordance with a thirteenth aspect of the present disclosure, the control device according to any one of the third to twelfth aspects is configured so that the riding information used for the changing condition is the same as the riding information used for the at least one shifting condition.

With the control device according to the thirteenth aspect, the number of parameters used by the electronic controller is reduced. This simplifies the program.

In accordance with a fourteenth aspect of the present disclosure, the control device according to any one of the third to twelfth aspects is configured so that the riding information used for the changing condition differs from the riding information used for the at least one shifting condition.

With the control device according to the fourteenth aspect, the shifting condition is changed based on information that differs from the riding information used for the shifting condition.

In accordance with a fifteenth aspect of the present disclosure, the control device according to any one of the third to fourteenth aspects is configured so that the electronic controller is configured to calculate a converging width of the riding information based on the riding information of the human-powered vehicle while the human-powered vehicle is in the riding convergence state.

With the control device according to the fifteenth aspect, the converging width of the riding information is used to control the human-powered vehicle.

In accordance with a sixteenth aspect of the present disclosure, the control device according to the fifteenth aspect is configured so that the electronic controller is configured to control an electric component mounted on the human-powered vehicle. The electronic controller is configured to change a control setting related with the electric component based on a converging width of the riding information.

The control device according to the sixteenth aspect changes the control setting of the electric component based on the converging width in a case where the human-powered vehicle is in a riding convergence state. Thus, the control setting of the electric component is changed to a value corresponding to riding.

In accordance with a seventeenth aspect of the present disclosure, the control device according to the sixteenth aspect is configured so that the electric component includes at least one of a suspension and an adjustable seatpost.

The control device according to the seventeenth aspect changes the control setting of the above devices.

In accordance with an eighteenth aspect of the present disclosure, the control device according to any one of the third to seventeenth aspects is configured so that the electronic controller is configured to control an electric assist unit. The electronic controller is configured to change a control setting related with the electric assist unit based on a converging value of the riding information of the human-powered vehicle while the human-powered vehicle is in the riding convergence state.

The control device according to the eighteenth aspect controls the electric assist unit based on the converging value in a case where the human-powered vehicle is in a riding convergence state. Thus, the control setting of the electric assist unit is changed in accordance with riding.

In accordance with a nineteenth aspect of the present disclosure, the control device according to the eighteenth aspect is configured so that the control setting related with the electric assist unit includes at least one of an assist mode, an assist ratio, and a torque limit value.

The control device according to the nineteenth aspect changes the above values of the control setting based on the converging value.

In accordance with a twentieth aspect of the present disclosure, the control device according to any one of the third to nineteenth aspects is configured so that the riding information includes at least one of a cadence, a torque of a crank, a vehicle speed, and an acceleration.

The control device according to the twentieth aspect changes the shifting condition based on the above riding information.

In accordance with a twenty-first aspect of the present disclosure, the control device according to any one of the first to twentieth aspects is configured so that the electronic controller is connected to an operation unit, and configured to change the at least one shifting condition based on input information received from the operation unit.

The control device according to the twenty-first aspect changes the shifting condition based on information input by the user.

The control device according to the present disclosure improves riding comfort of the human-powered vehicle.

BRIEF DESCRIPTION OF THE DRAWINGS

Referring now to the attached drawings which form a part of this original disclosure.

FIG. 9 is a table showing values of contents of items in riding-related information.

FIG. 10 is a table showing the relationship between riding-related information and shifting conditions and changing conditions in a first speed stage.

FIG. 11 is a table showing the relationship between speed stages and riding-related information and shifting conditions and changing conditions.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
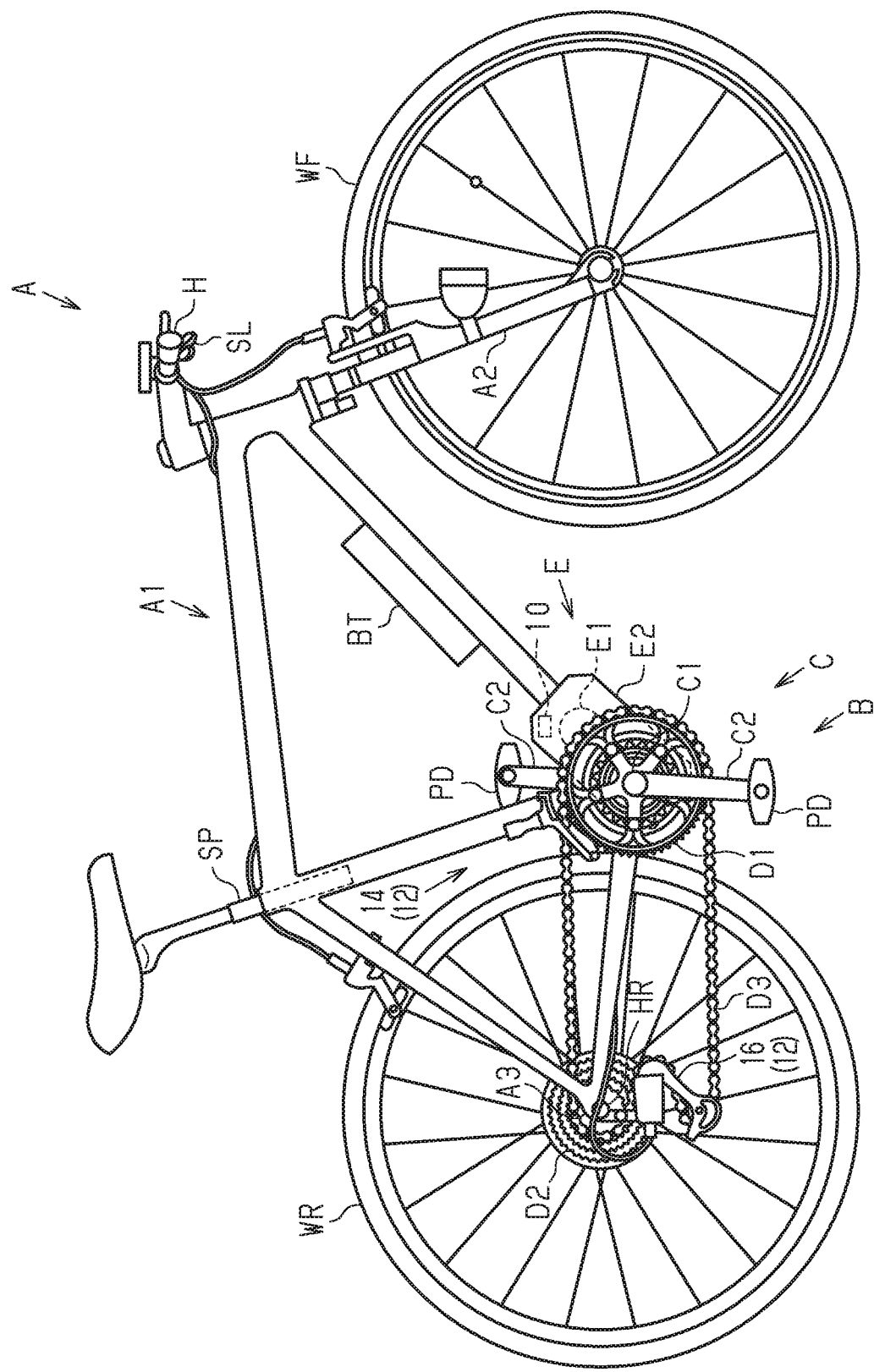
FIG. 1 is a side elevational view of a human-powered vehicle (e.g., a bicycle) including a control device in accordance with a first embodiment.

A human-powered vehicle A including a control device that controls a transmission will now be described with reference to FIG. 1. The human-powered vehicle A refers to a vehicle at least partially using human power as driving force for travelling and includes a vehicle electrically assisting human power. The human-powered vehicle A does not include vehicles using only driving force that is not human power. In particular, a vehicle using only an internal combustion engine as driving force is not included in the human-powered vehicle A. The human-powered vehicle A is generally assumed to be a small, light vehicle that does not require a license for driving on a public road. The illustrated human-powered vehicle A is a bicycle including an electric assist unit E assisting propulsion of the human-powered vehicle A with electrical energy. More specifically, the illustrated human-powered vehicle A is a trekking bike. The human-powered vehicle A further includes a frame A1, a front fork A2, a front wheel WF, a rear wheel WR, a handlebar H, and a drivetrain B.

The drivetrain B is, for example, a chain-drive type. The drivetrain B includes a crank C, front sprockets D1, rear sprockets D2, and a chain D3. The crank C includes a crankshaft C1 rotatably supported by the frame A1 and a pair of crank arms C2 respectively provided on opposite ends of the crankshaft C1. A pedal PD is rotatably coupled to the distal end of each of the crank arms C2. The drivetrain B can be selected from any type and can be a belt-drive type or a shaft-drive type.

The front sprockets D1 are provided on the crank C to rotate integrally with the crankshaft C1. The rear sprockets D2 are provided on a hub HR of the rear wheel WR. The chain D3 runs around the front sprockets D1 and the rear sprockets D2. Human driving force applied to the pedals PD by the rider of the human-powered vehicle A is transmitted via the front sprockets D1, the chain D3, and the rear sprockets D2 to the rear wheel WR.

The electric assist unit E is actuated to assist in propulsion of the human-powered vehicle A. The electric assist unit E is actuated, for example, in accordance with human driving force applied to the pedals PD. The electric assist unit E includes a motor E1. The electric assist unit E is actuated by electric power supplied from a battery BT mounted on the human-powered vehicle A.

The human-powered vehicle A includes a control device 10 and transmissions 12. The control device 10 controls the transmissions 12 of the human-powered vehicle A. The control device 10 is accommodated, for example, in a housing E2 of the electric assist unit E. The control device 10 is actuated by electric power supplied from the battery BT. The transmissions 12 are, for example, configured to be electrically driven in accordance with operations of shift levers SL. The transmissions 12 are actuated by electric power supplied from the battery BT or a dedicated power supply mounted on the transmissions 12. The transmissions 12 include an external transmission device. In an example, the transmissions 12 include at least one of a front derailleur 14 and a rear derailleur 16. The front derailleur 14 is provided in the vicinity of the front sprockets D1. As the front derailleur 14 is driven, the front sprocket D1 on which the chain D3 runs is changed to change the transmission ratio of the human-powered vehicle A. The rear derailleur 16 is provided on a rear end A3 of the frame A1. As the rear derailleur 16 is driven, the rear sprocket D2 on which the chain D3 runs is changed to change the transmission ratio of the human-powered vehicle A. The transmissions 12 can include an internal transmission device instead of the external transmission device. In this case, the internal transmission device is provided, for example, on the hub HR of the rear wheel WR. The transmissions 12 can include a stepless transmission device instead of the external transmission device. In this case, the stepless transmission device is provided, for example, on the hub HR of the rear wheel WR.

Figure 2:
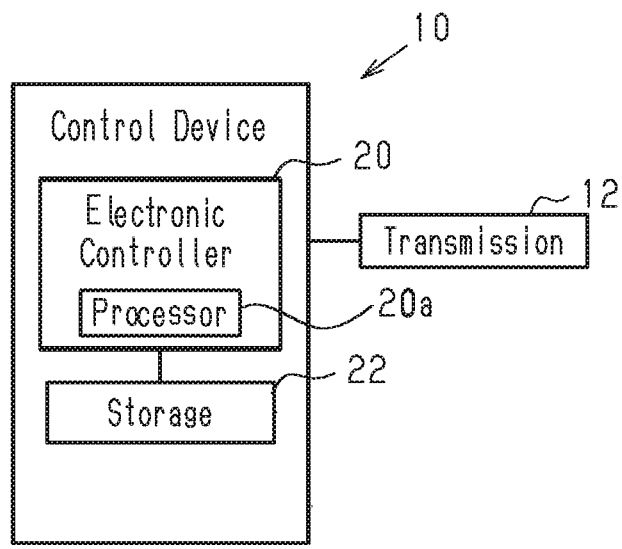
FIG. 2 is a block diagram showing the relationship between the control device shown in FIG. 1 and a transmission.

As shown in FIG. 2, the control device 10 includes an electronic controller 20 that controls the transmissions 12. The term "electronic controller" as used herein refers to hardware that executes a software program, and does not include a human. The electronic controller 20 is, for example, a central processing unit (CPU) or a micro processing unit (MPU) that includes at least one processor 20a that execute predetermined control programs. The processors can be located at separate positions. The electronic controller 62 can include one or more microcomputers. In an example, the electronic controller 20 controls the transmissions 12. The electronic controller 20 can control the transmissions 12, for example, in accordance with operations of the shift levers SL. The electronic controller 20 can further control various components installed on the human-powered vehicle A in addition to the transmissions 12 of the human-powered vehicle A. The control device 10 further includes storage 22 that stores various kinds of information, control programs and control processes. The storage 22 includes any computer storage device or any non-transitory computer-readable medium with the sole exception of a transitory, propagating signal. For example, the storage 64 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM). The storage 22 stores, for example, various programs for control and predetermined information.

The electronic controller 20 includes at least one shifting condition for actuating the transmissions 12 to shift the transmission ratio. Preferably, the shifting condition is provided in correspondence with each transmission ratio. The shifting condition is a condition that changes the transmission ratio.

The shifting condition is stored in the storage 22. In a case where the human-powered vehicle A is powered on, the electronic controller 20 obtains the shifting condition from the storage 22. The electronic controller 20 performs shifting using the transmissions 12 based on the shifting condition.

The shifting of the human-powered vehicle A will now be described. In an example, the shifting condition includes a first threshold value TH1 for riding information of the human-powered vehicle A and a second threshold value TH2 that is lower than the first threshold value TH1. The riding information includes at least one of cadence, torque of the crank, vehicle speed, and acceleration. In the present embodiment, cadence is the riding information used to determine whether to perform the shifting based on the shifting condition. The electronic controller 20 obtains cadence from a cadence sensor provided on the human-powered vehicle A. In addition, the electronic controller 20 estimates cadence based on other riding information items. For example, the electronic controller 20 estimates cadence based on wheel rotation speed and the transmission ratio. For example, in a case where the crankshaft is stopped during traveling, the electronic controller 20 uses the estimated cadence in various controls. The electronic controller 20 executes "the shifting process" described below to determine whether to perform shifting. In a case where the shifting condition is satisfied, the electronic controller 20 issues a shifting instruction to the transmissions 12.

Figure 3:
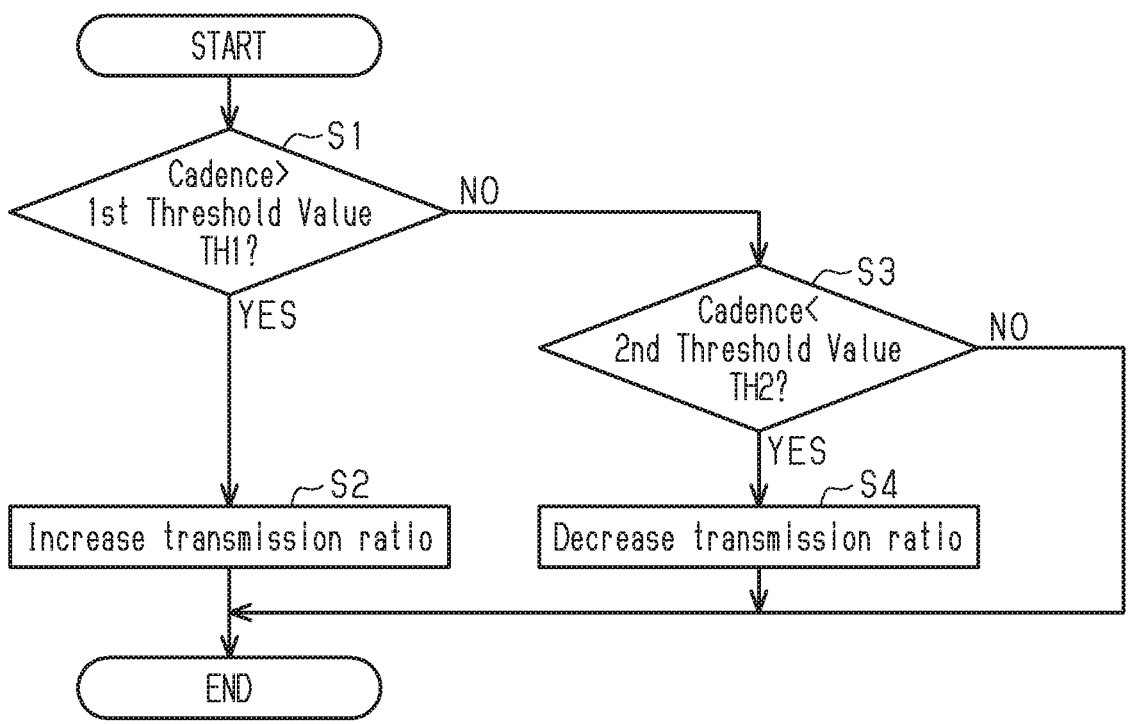
FIG. 3 is a flowchart showing an example of a shifting process executed by an electronic controller of the control device shown in FIG. 1.

"The shifting process" will now be described with reference to FIG. 3. The electronic controller 20 repeatedly executes the shifting process. In the first step S1, the electronic controller 20 determines whether cadence is greater than the first threshold value TH1. In a case where cadence is greater than the first threshold value TH1, in the second step S2, the electronic controller 20 issues an instruction to the transmissions 12 to increase the transmission ratio. In a case where cadence is less than or equal to the first threshold value TH1, the electronic controller 20 executes the third step S3.

In the third step S3, the electronic controller 20 determines whether cadence is less than the second threshold value TH2. In a case where cadence is less than the second threshold value TH2, in the fourth step S4, the electronic controller 20 issues an instruction to the transmissions 12 to decrease the transmission ratio. In a case where cadence is greater than or equal to the second threshold value TH2, the electronic controller 20 terminates the shifting process. After a predetermined time elapses, the electronic controller 20 again executes the shifting process.

As described above, in the present embodiment, the electronic controller 20 issues a shifting instruction based on the value of cadence. The condition of the first step S1 is a condition for upshifting. The condition of the third step S3 is a condition for downshifting.

In addition to shifting conditions set in advance for each transmission ratio, the electronic controller 20 holds other shifting conditions. In the present embodiment, the electronic controller 20 holds a shifting condition related with riding-related information of the human-powered vehicle A in a case where the human-powered vehicle A is in a riding convergence state. The phrase "holding a shifting condition" includes at least one of the electronic controller 20 being configured to access a shifting condition stored in the storage 22 and the electronic controller 20 including a memory storing a shifting condition.

The electronic controller 20 can hold a plurality of different shifting conditions for at least one transmission ratio (refer to FIG. 10). Each shifting condition is related with riding-related information of the human-powered vehicle A in a case where the human-powered vehicle A is in the riding convergence state. The riding-related information includes information indicating a riding state of the human-powered vehicle A and information that affects the riding state of the human-powered vehicle A. In an example, the riding-related information is at least one of riding information of the human-powered vehicle A, device setting information of the human-powered vehicle A, body information of the user of the human-powered vehicle A, and environment information of the environment of the human-powered vehicle A.

The riding information of the human-powered vehicle A includes cadence, torque of the crank, vehicle speed, and acceleration. The device setting information of the human-powered vehicle A includes pneumatic pressure of the rear wheel WR, pneumatic pressure of the front wheel WF, the assist ratio of the electric assist unit E, an adjusted value of damping force of a suspension, and height of an adjustable seatpost SP. The body information of the user of the human-powered vehicle A includes information related with the body such as heart rate, maximum blood pressure, and minimum blood pressure and information related with physical conditions of the user, for example, in commuting hour, working hour, returning hour, on holiday, day information, at time of starting riding, ten minutes after riding started, sixty minutes after riding started, and five hours after riding started. The environment information of the environment of the human-powered vehicle A includes gradient information such as a flat ground with a grade of +1% or greater and −1% or less, an uphill with a 3% grade, an elevated path with a 5% grade, and a mountain path with a 10% grade, information based on a global positioning system (GPS), and information related with travel on a mountain road and a paved state of a road.

The riding convergence state of the human-powered vehicle A occurs in various situations. In other words, the term "riding convergence state" is a predetermined state that occurs when a certain riding conditions are met. For example, the riding convergence state is established while traveling on a flat road, and cadence is substantially constant. The riding convergence state can be established even on a gradual uphill or downhill when cadence is substantially constant. The riding convergence state can differ between different environments of the human-powered vehicle A even at the same transmission ratio.

Furthermore, the riding convergence state can differ between users such that a preferred range of cadence is different for different users to establish the riding convergence state for that user. For example, a user having strong legs will obtain greater cadence than other users for determining establishment of the riding convergence state. The preferred range of cadence for determining establishment of the riding convergence state also varies depending on the physical condition of the user. Cadence for determining establishment of the riding convergence state will be increased in a case of the user having a good physical condition. Cadence for determining establishment of the riding convergence state will be decreased in a case of the user having a bad physical condition.

In this respect, as described above, it is preferred that the electronic controller 20 hold a shifting condition that is related with riding-related information of the human-powered vehicle A in a case where the electronic controller 20 has been determined that the human-powered vehicle A is in the riding convergence state.

The electronic controller 20 can include a shifting condition that differs between a first transmission ratio and a second transmission ratio. In this case, at each transmission ratio, it is preferred that the electronic controller 20 hold a shifting condition that is related with riding-related information of the human-powered vehicle A in a case where the electronic controller 20 has been determined that the human-powered vehicle A is in the riding convergence state.

Association of the shifting condition with the riding-related information of the human-powered vehicle A in a case where the electronic controller 20 has been determined that the human-powered vehicle A is in the riding convergence state will now be described with reference to FIGS. 4 to 11. The association mainly includes three steps. In the first step, the electronic controller 20 determines whether the human-powered vehicle A is in the riding convergence state. In the second step, the electronic controller 20 determines whether the riding information satisfies a reference upon determining the riding convergence state is satisfied. In the third step, upon determining the riding convergence state is satisfied and the riding information does not satisfy the predetermined reference, the electronic controller 20 changes the shifting condition and associates the riding-related information with the changed shifting condition. The detail will be described below.

Figure 4:
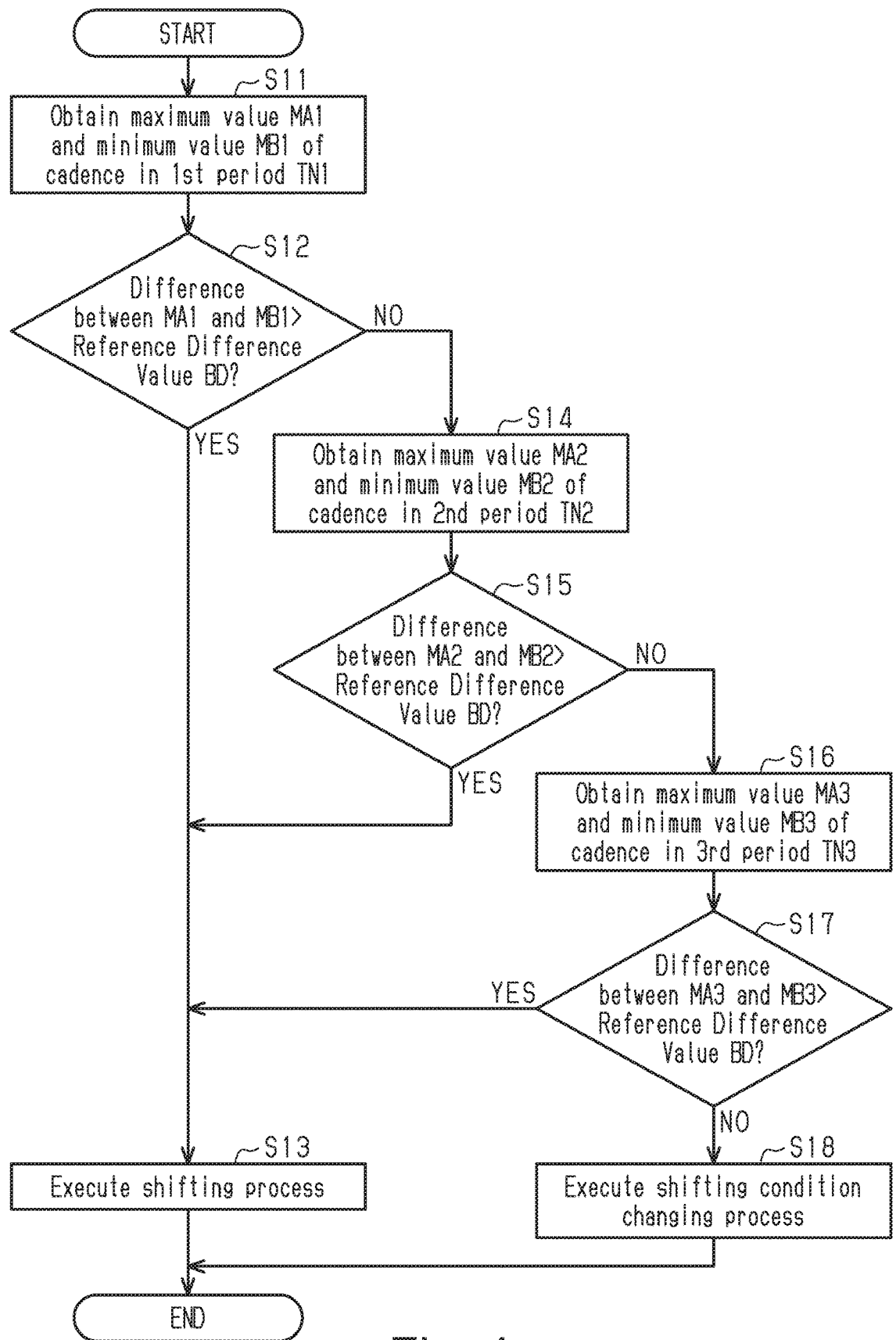
FIG. 4 is a flowchart showing an example of "riding convergence state determination process" executed by the electronic controller of the control device shown in FIG. 1.
Figure 5:
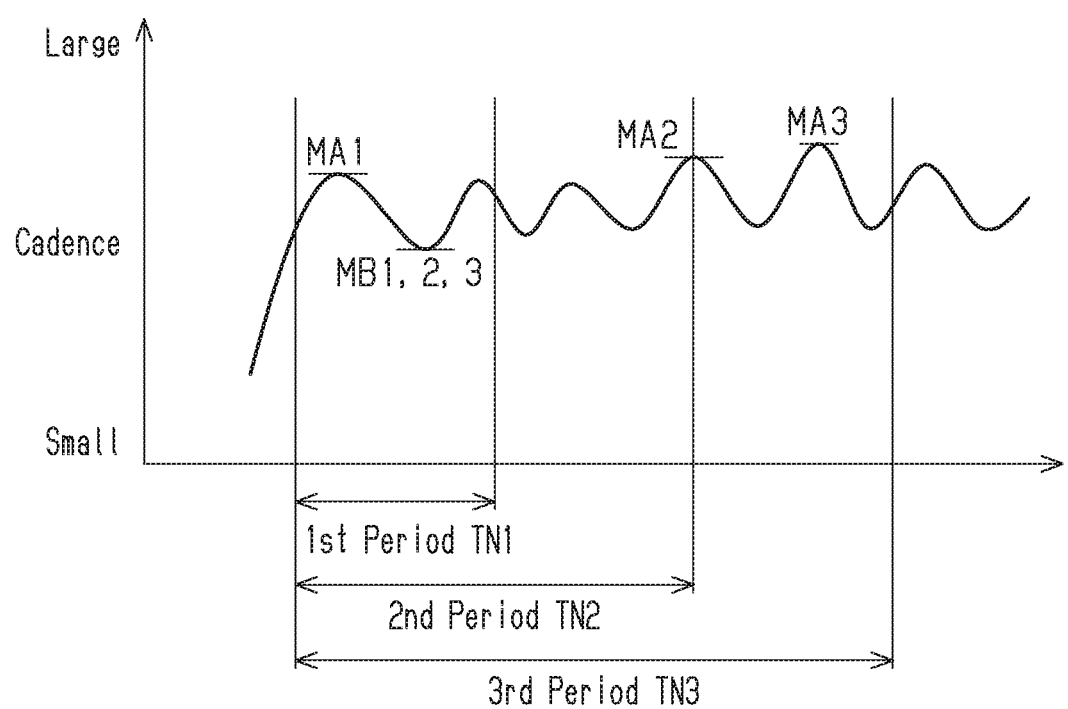
FIG. 5 is a chart showing changes in cadence.

FIG. 4 shows an example of "riding convergence state determination process" that determines the riding convergence state of the human-powered vehicle A. The electronic controller 20 repeatedly executes "the riding convergence state determination process." FIG. 5 is a chart showing "the riding convergence state determination process." A second period TN2 is longer than a first period TN1. A third period TN3 is longer than the second period TN2.

In the first step S11, the electronic controller 20 obtains cadence over the first period TN1. The electronic controller 20 obtains a maximum value MA1 and a minimum value MB1 in the first period TN1 from the obtained cadence. In the second step S12, the electronic controller 20 calculates the difference between the maximum value MA1 and the minimum value MB1 and determines whether the difference between the maximum value MA1 and the minimum value MB1 is greater than a reference difference value BD. The reference difference value BD is a reference value used to determine whether cadence is convergent. In a case where the difference between the maximum value MA1 and the minimum value MB1 is greater than the reference difference value BD, the electronic controller 20 executes "the shifting process" described above in the third step S13.

In the second step S12, in a case where the difference between the maximum value MA1 and the minimum value MB1 is less than or equal to the reference difference value BD, the electronic controller 20 obtains cadence until the second period TN2 elapses to obtain a maximum value MA2 and a minimum value MB2 of cadence in the second period TN2 in the fourth step S14. In the fifth step S15, the electronic controller 20 calculates the difference between the maximum value MA2 and the minimum value MB2 and determines whether the difference between the maximum value MA2 and the minimum value MB2 is greater than the reference difference value BD. In a case where the difference between the maximum value MA2 and the minimum value MB2 is greater than the reference difference value BD, the electronic controller 20 executes "the shifting process" described above in the third step S13.

In the fifth step S15, in a case where the difference between the maximum value MA2 and the minimum value MB2 is less than or equal to the reference difference value BD, the electronic controller 20 obtains cadence until the third period TN3 elapses to obtain a maximum value MA3 and a minimum value MB3 of cadence in the third period TN3 in the sixth step S16. In the seventh step S17, the electronic controller 20 calculates the difference between the maximum value MA3 and the minimum value MB3 and determines whether the difference between the maximum value MA3 and the minimum value MB3 is greater than the reference difference value BD. In a case where the difference between the maximum value MA3 and the minimum value MB3 is greater than the reference difference value BD, the electronic controller 20 executes the "the shifting process" described above in the third step S13. In a case where the difference between the maximum value MA3 and the minimum value MB3 is less than or equal to the reference difference value BD, "the shifting condition changing process" is executed.

As described above, in the present embodiment, the electronic controller 20 defines the state in which the difference between the maximum value MA and the minimum value MB is less than or equal to the reference difference value BD over the third period TN3 as the riding convergence state. In the riding convergence state, the electronic controller 20 executes "the shifting condition changing process," which will be described later.

Figure 6:
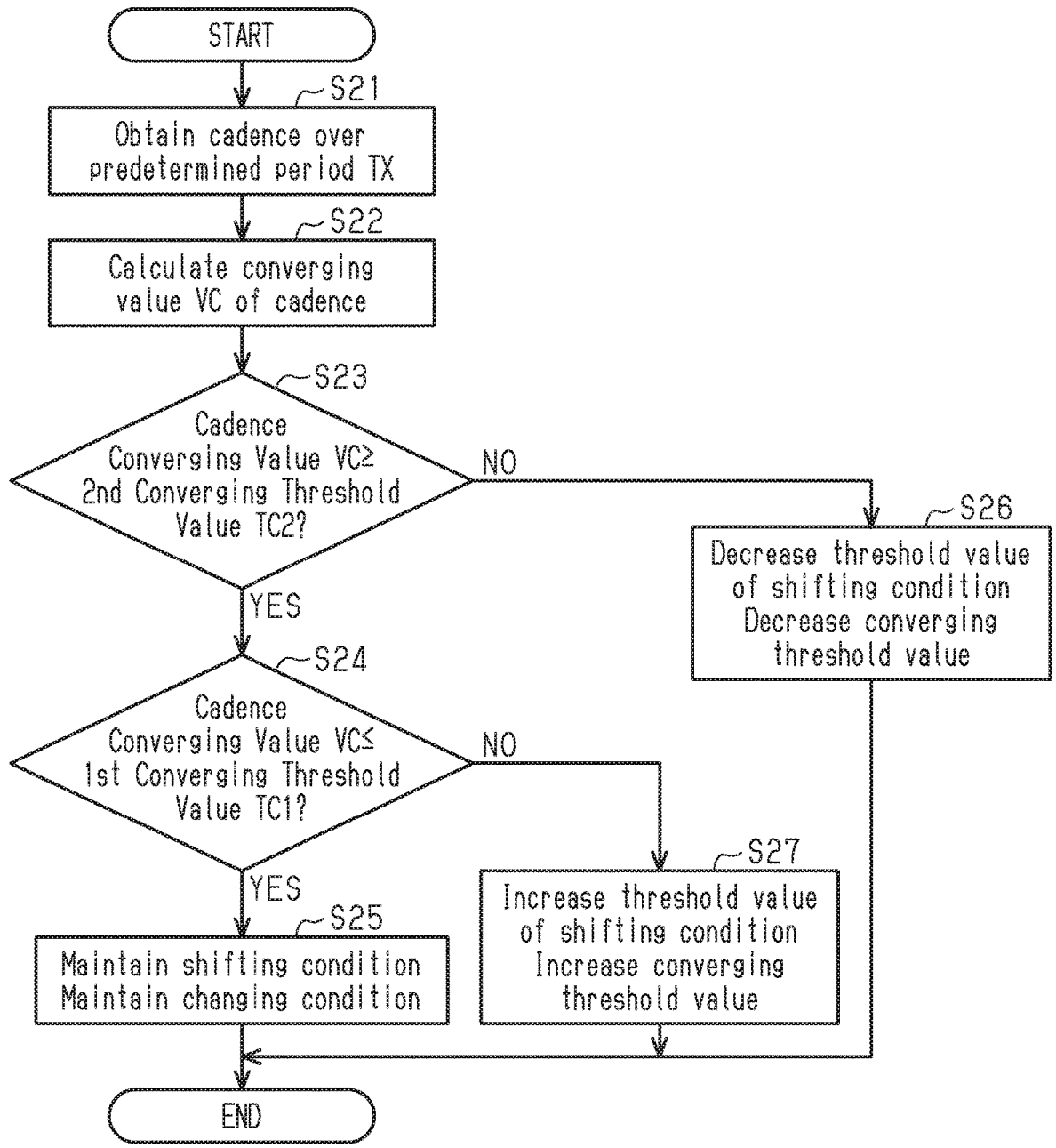
FIG. 6 is a flowchart showing an example of "shifting condition changing process" executed by the electronic controller of the control device shown in FIG. 1.

Changing the shifting condition will now be described with reference to FIGS. 6 to 8. In the present embodiment, the electronic controller 20 determines whether a changing condition is satisfied for changing the shifting condition. The detail will now be described.

The electronic controller 20 includes a changing condition for changing the shifting condition. The changing condition is satisfied upon determining the riding information of the human-powered vehicle A does not satisfy a predetermined reference while the human-powered vehicle A is in the riding convergence state. The changing condition is provided for at least one shifting condition.

The predetermined reference includes a predetermined reference range from which a value is taken by the riding information of the human-powered vehicle A while the human-powered vehicle A is in the riding convergence state. In an example, the changing condition is satisfied where a converging value of the riding information takes a value outside the predetermined reference range while the human-powered vehicle A is in the riding convergence state. Therefore, in a case where the human-powered vehicle A is in the riding convergence state and the converging value of the riding information takes a value inside the predetermined reference range, the changing condition is not satisfied, and the transmission ratio remains the same.

In the present embodiment, the predetermined reference range is specified as a range of values taken by cadence, which is used as the riding information of the human-powered vehicle A. More specifically, the predetermined reference range is greater than or equal to a second converging threshold value TC2 and is less than or equal to a first converging threshold value TC1. The second converging threshold value TC2 is less than the first converging threshold value TC1. Both the first converging threshold value TC1 and the second converging threshold value TC2 are greater than the second threshold value TH2, which is one of the shifting conditions, and are less than the first threshold value TH1, which is the other of the shifting conditions (refer to FIG. 8). In an example, the first converging threshold value TC1 is greater a median value between the first threshold value TH1 and the second threshold value TH2. The second converging threshold value TC2 is less than the median value between the first threshold value TH1 and the second threshold value TH2. A typical median value between the first threshold value TH1 and the second threshold value TH2 is an average value of the first threshold value TH1 and the second threshold value TH2.

In a case where the human-powered vehicle A is in the riding convergence state, the electronic controller 20 changes the shifting condition to increase the median value of the shifting condition if the riding information takes a value corresponding to a momentum that is greater than a momentum corresponding to a state where the riding information is in the predetermined reference range. The momentum refers to the value of a momentum applied to the crank of the human-powered vehicle A. In the riding convergence state of the human-powered vehicle A, in a case where cadence, which is used as the riding information, is greater than the first converging threshold value TC1, that is, the upper limit value of the predetermined reference range, the momentum applied to the crank of the human-powered vehicle A is greater than a momentum applied to the crank in a case where cadence takes a value inside the predetermined reference range. In such a case, it is preferred that the transmission ratio be increased. Hence, in a case where the human-powered vehicle A is in the riding convergence state and cadence, which is used as the riding information, is greater than the first converging threshold value TC1, that is, the upper limit value of the predetermined reference range, the electronic controller 20 increases both the first threshold value TH1 of the second threshold value TH2 of the shifting conditions.

In a case where the human-powered vehicle A is in the riding convergence state, the electronic controller 20 changes the shifting condition to decrease the median value of the shifting condition if the riding information takes a value corresponding to a momentum that is greater than a momentum corresponding to a state where the riding information is in the predetermined reference range. The momentum refers to the amount of torque applied to the crank of the human-powered vehicle A. In the riding convergence state of the human-powered vehicle A, in a case where cadence, which is used as the riding information, is less than the second converging threshold value TC2, that is, the lower limit value of the predetermined reference range, the momentum applied to the crank of the human-powered vehicle A is less than a momentum applied to the crank in a case where cadence takes a value inside the predetermined reference range. In such a case, it is preferred that the transmission ratio be decreased. Hence, in a case where the human-powered vehicle A is in the riding convergence state and cadence, which is used as the riding information, is less than the second converging threshold value TC2, that is, the lower limit value of the predetermined reference range, the electronic controller 20 decrease both the first threshold value TH1 of the second threshold value TH2 of the shifting conditions.

"The shifting condition changing process" executed by the electronic controller 20 will now be described with reference to FIG. 6. As described above, in a case where the human-powered vehicle A is in the riding convergence state, the electronic controller 20 executes "the shifting condition changing process." The electronic controller 20 determines whether to change the changing condition in "the shifting condition changing process."

In the first step S21, the electronic controller 20 obtains cadence over a predetermined period TX. In the second step S22, the electronic controller 20 calculates a converging value VC of cadence based on cadence obtained in the predetermined period TX. For example, the electronic controller 20 calculates an average value of cadence as the converging value VC.

In the third step S23, the electronic controller 20 determines whether the converging value VC of cadence is greater than or equal to the second converging threshold value TC2. In a case where the converging value VC of cadence is greater than or equal to the second converging threshold value TC2, the electronic controller 20 determines whether the converging value VC of cadence is less than or equal to the first converging threshold value TC1 in the fourth step S24. In a case where the converging value VC of cadence is less than or equal to the first converging threshold value TC1, the electronic controller 20 does not change the shifting condition and maintains the shifting condition in the fifth step S25. That is, in the riding convergence state of the human-powered vehicle A, in a case where the human-powered vehicle A is in the riding convergence state and cadence satisfies the predetermined reference, the electronic controller 20 maintains the shifting condition.

In the third step S23, in a case where the converging value VC of cadence is less than the second converging threshold value TC2, the electronic controller 20 decreases the first threshold value TH1 and the second threshold value TH2, which are the threshold values of the shifting conditions, and also decreases the first converging threshold value TC1 and the second converging threshold value TC2 in the sixth step S26.

Figure 7:
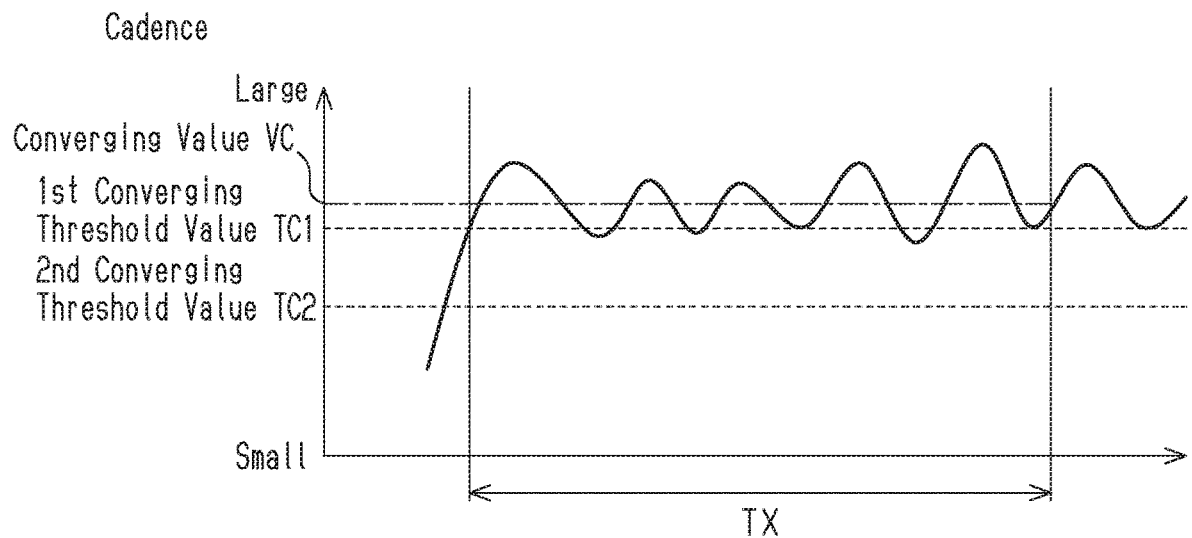
FIG. 7 is a chart showing changes in cadence.

In the fourth step S24, as shown in FIG. 7, in a case where the converging value VC of cadence is greater than the first converging threshold value TC1, the electronic controller 20 increases the first threshold value TH1 and the second threshold value TH2, which are the threshold values of the shifting conditions, and also increases the first converging threshold value TC1 and the second converging threshold value TC2 in the seventh step S27.

Figure 8:
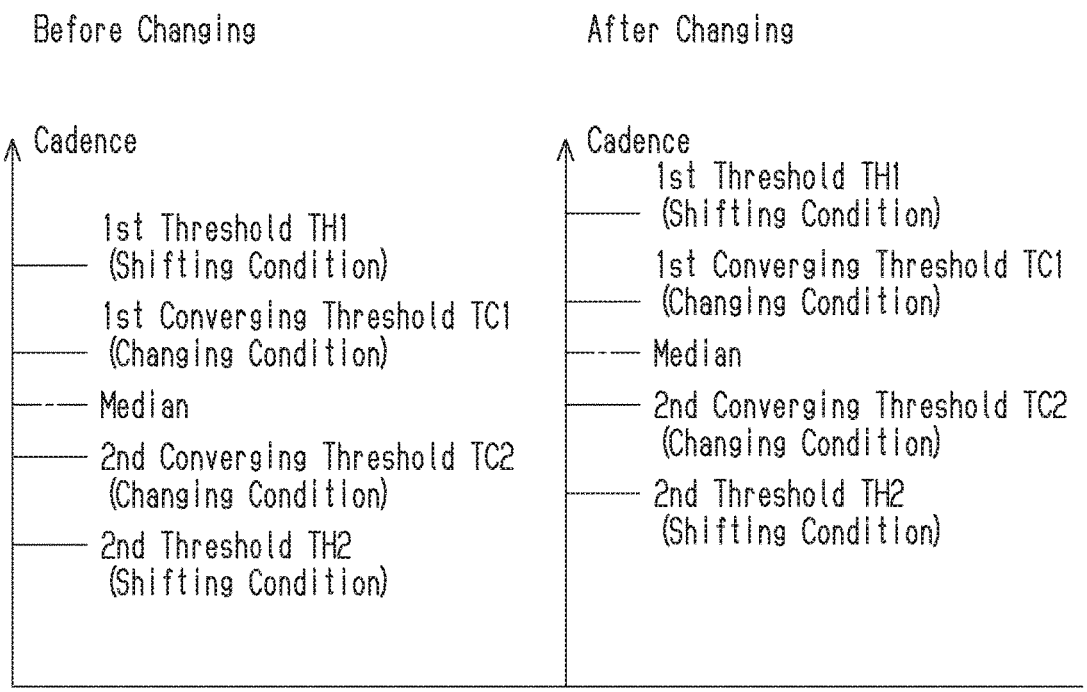
FIG. 8 is a schematic diagram showing the relationship between shifting conditions and changing conditions before changing and shifting conditions and changing conditions after changing.

FIG. 8 is a schematic diagram showing the first threshold value TH1 and the second threshold value TH2, which are the threshold values of the shifting conditions, and the first converging threshold value TC1 and the second converging threshold value TC2, which are the threshold values of the changing conditions, before and after changing. FIG. 8 shows changes in the shifting condition and the changing condition in a case where the converging value VC of cadence is greater than the first converging threshold value TC1. FIG. 8 shows a state in which the first threshold value TH1 and the second threshold value TH2, which are the threshold values of the shifting conditions, are changed to be increased, and also the first converging threshold value TC1 and the second converging threshold value TC2 are changed to be increased.

In addition, in a case where the changing condition is satisfied and the electronic controller 20 changes the shifting condition, the electronic controller 20 obtains the riding-related information related to a state of changing the shifting condition and stores the riding-related information and the changed shifting condition in association with each other in the storage 22. In the description hereafter, such storing of association is also referred to as "learning."

In a case of changing the shifting condition and the changing condition related with the transmission ratio, the electronic controller 20 associates the transmission ratio related to a state of changing, the riding-related information, the shifting condition, and the changing condition with each other. More specifically, in a case of changing the shifting condition and the changing condition, the electronic controller 20 obtains the riding-related information from the human-powered vehicle A and a device related with the human-powered vehicle A.

As shown in FIG. 9, in the present embodiment, the electronic controller 20 obtains torque of the crank as the riding information, seat height of the adjustable seatpost SP as the device setting information, heart rate as the body information, and road gradient as the environment information. The electronic controller 20 obtains torque from a torque sensor provided on the crank. The electronic controller 20 obtains seat height from a seat height sensor provided on the adjustable seatpost SP. The electronic controller 20 obtains heart rate from a heart rate sensor attached to the rider of the human-powered vehicle A through wireless or wired communication. The electronic controller 20 obtains road gradient from an inclination sensor provided on the human-powered vehicle A or an information terminal configured to obtain terrain information.

After the riding-related information is obtained from the human-powered vehicle A and the devices related with the human-powered vehicle A, the electronic controller 20 stores the transmission ratio in a case where the human-powered vehicle A is in the riding convergence state, the riding-related information, the changed shifting condition, and the changed changing condition in association with each other in the storage 22.

An example of the shifting condition and the changing condition associated with the riding-related information will now be described with reference to FIGS. 9 to 11. FIG. 9 is a table showing an example of the riding-related information. In the present embodiment, the riding-related information includes the riding information, the device setting information, the body information, and the environment information as items. The riding-related information can include other items. The riding information includes torque as content. Values of torque are "large," "medium," and "small." The riding information can include other contents. The device setting information includes seat height as content. Values of the seat height are "high," "middle," and "low." The device setting information can include other contents. The body information includes heart rate as content. Values of heart rate are "normal," "low," and "high." The body information can include other contents. The environment information includes road gradient as content. Values of the road gradient are "flat," "up," and "down." The environment information can include other contents.

FIG. 10 is a table showing the relationship among the speed stage, the riding-related information associated with the speed stage, and a condition set that includes the shifting condition and the changing condition. The speed stage is a name given to a predetermined transmission ratio. In an example, a first speed stage has a greater transmission ratio than a second speed stage.

In the example shown in FIG. 10, the first speed stage is associated two sets of the riding-related information and the condition sets, which include the shifting condition and the changing condition. The first set of the riding-related information CX2 includes four information pieces, that is, large torque, middle seat height, normal heart rate, and flat road gradient. The second set of the riding-related information CX3 includes four information pieces that are large torque, middle seat height, normal heart rate, and up road gradient. The first set of the riding-related information CX2 is associated with the first threshold value TH1 (AA01), the second threshold value TH2 (AA02), the first converging threshold value TC1 (AA03), and the second converging threshold value TC2 (AA04). The second set of the riding-related information CX3 is associated with the first threshold value TH1 (AA05), the second threshold value TH2 (AA06), the first converging threshold value TC1 (AA07), and the second converging threshold value TC2 (AA08). The association of the riding-related information CX2 with the threshold values and the association of the riding-related information CX3 with the threshold values are performed through the learning of the electronic controller 20. The value of each threshold value is indicted in parentheses.

FIG. 11 is a table showing the relationship between the riding-related information CX2 and CX3 and the condition sets in multiple speed stages. In FIG. 11, CX1 shows initial values of the riding-related information. CX2 shows the first set of the riding-related information. CX3 shows the second set of the riding-related information. The four parameters in parentheses following CX1, CX2, and CX3 indicate the first threshold value TH1, the second threshold value TH2, the first converging threshold value TC1, and the second converging threshold value TC2 associated with the corresponding riding-related information. As described above, in an example, the speed stage, the riding-related information, and the condition set are stored in an array data format.

Use of the riding-related information stored in the storage 22 will now be described. The electronic controller 20 obtains the stored riding-related information. In a case where riding-related information obtained from the human-powered vehicle A and the devices related with the human-powered vehicle A matches the riding-related information obtained from the storage 22, the electronic controller 20 changes the shifting condition prior to changing to the shifting condition associated with the riding-related information.

In an example, in a case where the human-powered vehicle A is in the riding convergence state, the electronic controller 20 obtains the riding-related information from the storage 22. The riding-related information of the human-powered vehicle A in a case where the human-powered vehicle A is in the riding convergence state can match the riding-related information stored in the storage 22. In this case, the electronic controller 20 uses the shifting condition associated with the stored riding-related information as the shifting condition in the present riding convergence state of the human-powered vehicle A. As described above, in a case where the human-powered vehicle A enters the riding convergence state with riding-related information that is similar to the previous riding-related information, the shifting condition associated with the riding-related information corresponding to the previous riding convergence state is used.

In a case where a plurality of shifting conditions are stored in association with the riding-related information, the electronic controller 20 calculates a new shifting condition based on the plurality of shifting conditions and changes the shifting condition prior to changing to the new shifting condition.

For example, one of the transmission ratios can be associated with a plurality of shifting conditions associated with the riding-related information. In this case, in a case where the human-powered vehicle A is in the riding convergence state, it is assumed that information that matches the riding-related information of the human-powered vehicle A can match two or more sets of riding-related information associated with the transmission ratio. In such a case, the electronic controller 20 calculates a new shifting condition based on the shifting condition associated with each set of the stored riding-related information, and uses the new shifting condition. In an example, the electronic controller 20 executes "the shifting condition selecting process" described below.

Figure 12:
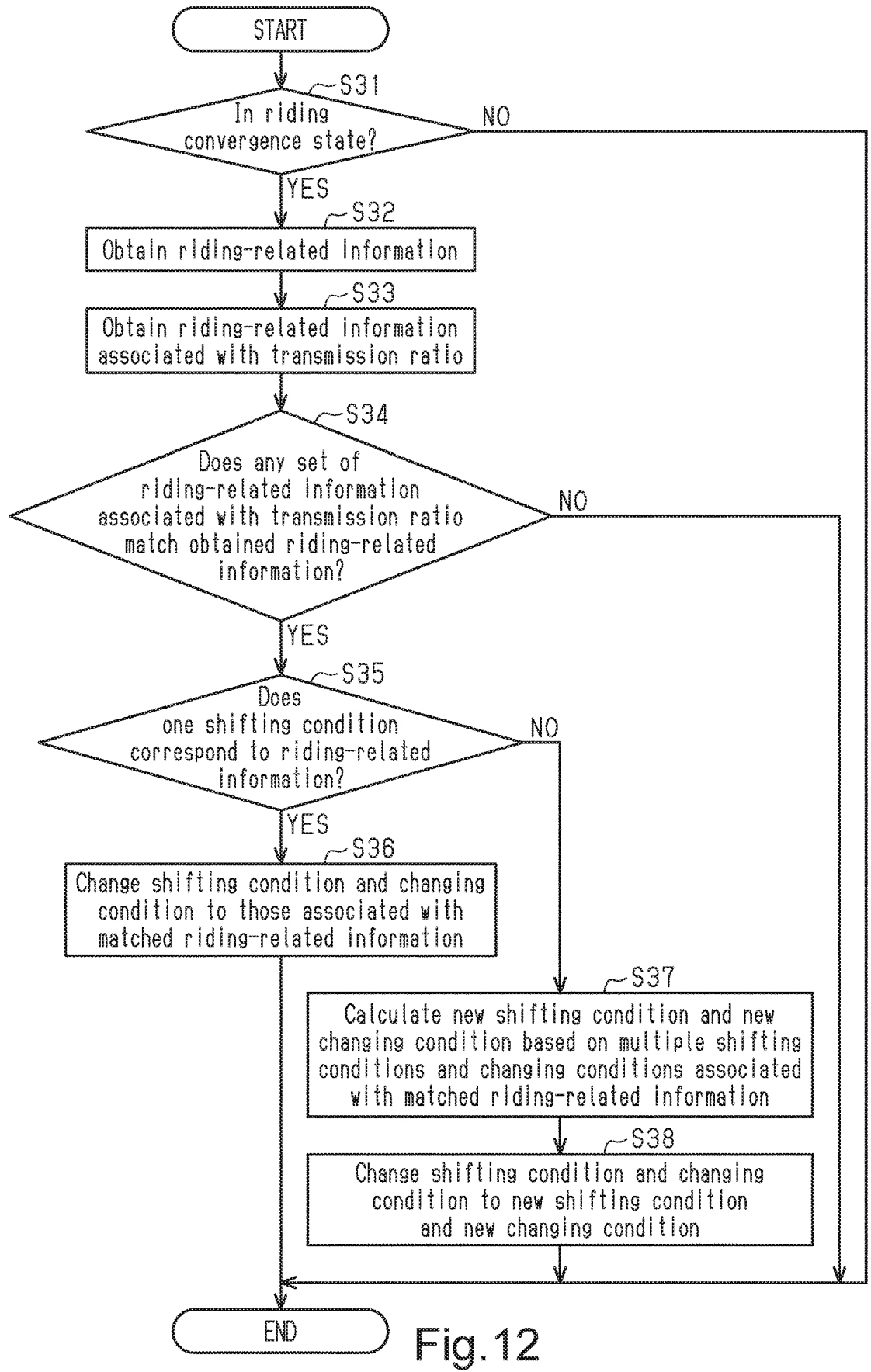
FIG. 12 is a flowchart showing an example of "shifting condition selecting process" executed by the control device shown in FIG. 1.

"The shifting condition selecting process" will now be described with reference to FIG. 12. The electronic controller 20 selects a suitable shifting condition through "the shifting condition selecting process." The electronic controller 20 cyclically executes "the shifting condition selecting process."

In the first step S31, whether the human-powered vehicle A is in the riding convergence state is determined. This determination is made in "the riding convergence state determination process" described above. More specifically, in a case where the difference between the maximum value MA3 and the minimum value MB3 is less than or equal to the reference difference value BD over the third period TN3, the electronic controller 20 determines the riding convergence state.

In a case where the electronic controller 20 determines the riding convergence state in the first step S31, the electronic controller 20 obtains the riding-related information in a case where the above state is satisfied from the human-powered vehicle A and the devices related with the human-powered vehicle A in the second step S32. In the third step S33, the electronic controller 20 also obtains the riding-related information associated with the transmission ratio in a case where the above state is satisfied from the storage 22.

In the fourth step S34, the electronic controller 20 determines whether one or more sets of riding-related information associated with the transmission ratio match the riding-related information obtained in a case where the riding convergence state is determined. In a case where information that matches the riding-related information is present, whether the number of matched sets of information is one is determined in the fifth step S35. In a case where the number of matched sets of information is one, the electronic controller 20 executes the sixth step S36. In a case where the number of matched sets of information is not one, the electronic controller 20 executes the seventh step S37 and the eighth step S38, which will be described below. In the fourth step S34, in a case where the number of matched sets of information is not one or more, that is, zero, the determination process of "the shifting condition selecting process" is ended.

In a case where the number of matched sets of the riding-related information is one, the electronic controller 20 changes the shifting condition and the changing condition in the riding convergence state to the shifting condition and the changing condition associated with the riding-related information obtained from the storage 22 in the sixth step S36.

Thus, the shifting condition and the changing condition that are previously associated with the riding-related information are retrieved.

In a case where the number of matched sets of riding-related information is two or more, the electronic controller 20 calculates an average value of the shifting conditions associated with the riding-related information to store the average value as a new shifting condition, and calculates an average value of the changing conditions associated with the riding-related information to store the average value as a new changing condition in the seventh step S37. In the eighth step S38, the electronic controller 20 changes the shifting condition and the changing condition in the riding convergence state to the new shifting condition and the new changing condition. Thus, the shifting condition and the changing condition that are previously associated with the riding-related information are retrieved.

Figure 13:
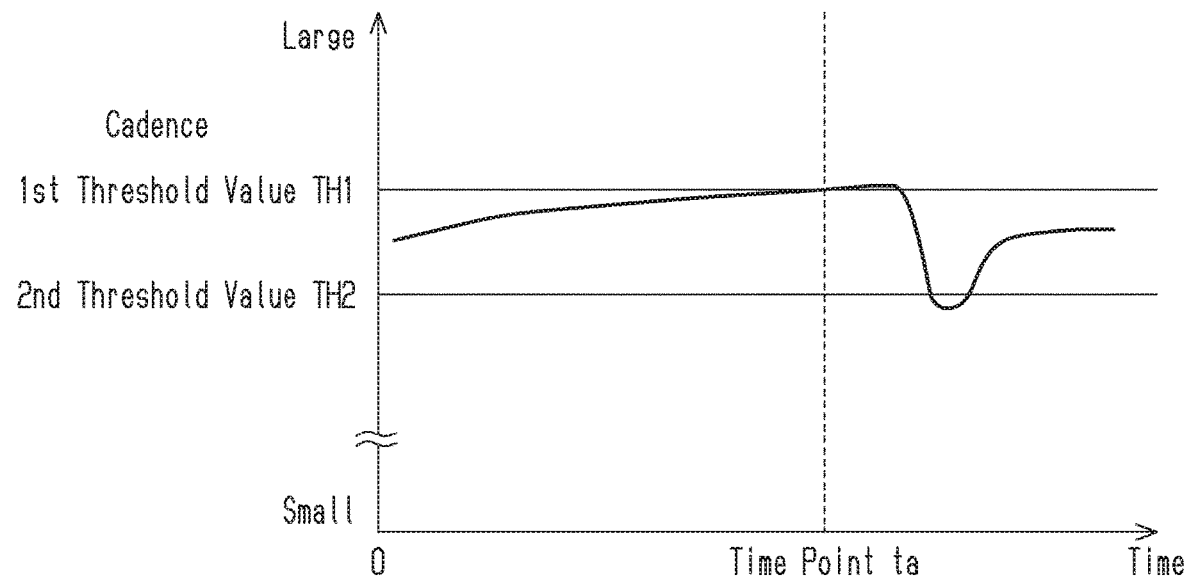
FIG. 13 is a chart showing changes in cadence in a reference example in which shifting conditions are fixed.
Figure 14:
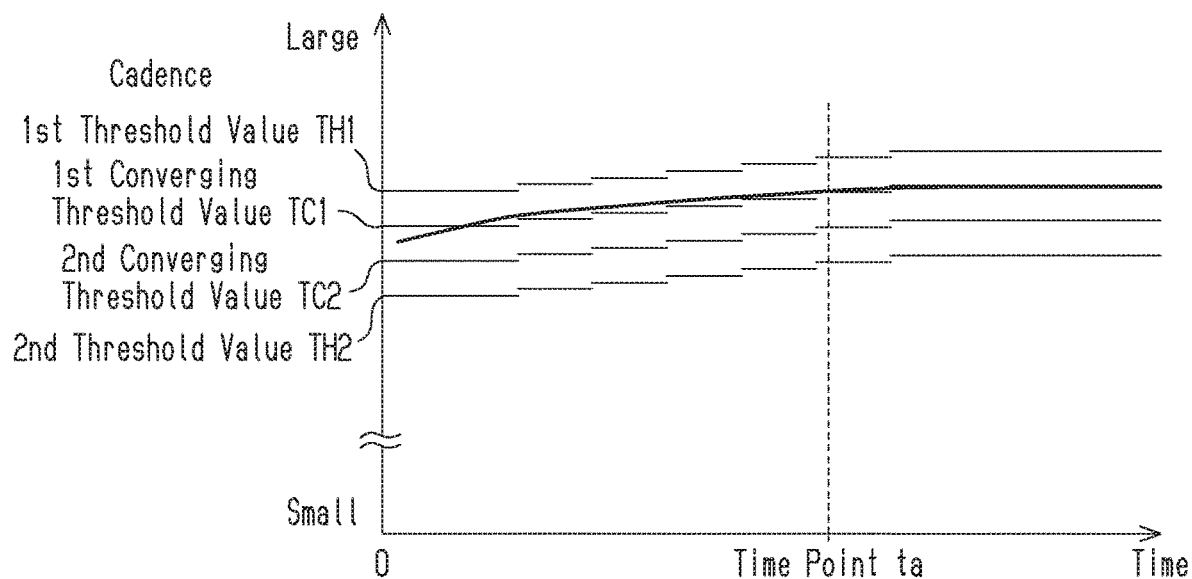
FIG. 14 is a chart showing changes in cadence in an embodiment in which shifting conditions are changed.

The operation of the control device 10 will now be described with reference to FIGS. 13 and 14. FIG. 13 shows changes in cadence in a reference control device having a fixed shifting condition in a case where the human-powered vehicle A is in the riding convergence state. FIG. 14 shows changes in cadence in a case where the human-powered vehicle A is in the riding convergence state and the shifting condition is changed by the control device 10 of the present embodiment.

The examples shown in FIGS. 13 and 14 both show that cadence is gradually increased while maintaining the riding convergence state. For example, while traveling on a flat straight road or a gradual downhill road, the riding is stable, and the speed can be gradually increased. In such a case, in a case where the shifting condition is fixed, at time point "ta" where cadence exceeds the first threshold value TH1, the transmission ratio is automatically increased as shown in FIG. 13. At this time, force for rotating the crank suddenly increases. This can distract the rider from a comfortable ride feel. In addition, a sudden increase in the load applied to the legs can cause a temporary decrease in cadence. As a result, cadence decreases to below the second threshold value TH2, and the transmission ratio is automatically decreased. This can cause repetition of unnecessary shifting.

In this regard, in the control device 10 of the present embodiment, in a case where cadence exceeds the first converging threshold value TC1 in the riding convergence state, the first threshold value TH1 and the second threshold value TH2 are increased, accordingly. Therefore, even at time point "ta", where cadence reaches the value equal to the initial value of the first converging threshold value TC1, shifting is not performed. As described above, the transmission ratio remains the same in the riding convergence state. The rider can continue a comfortable ride at the same transmission ratio.

The operation of the control device 10 of the present embodiment will now be described. The control device 10 holds the shifting condition that is related with riding-related information of the human-powered vehicle A in a case where the human-powered vehicle A is in the riding convergence state. An example of a situation in which the electronic controller 20 holds the shifting condition is as follows. In a case where the human-powered vehicle A enters the riding convergence state, the control device 10 stores the present riding-related information of the human-powered vehicle A and the present shifting condition in association with each other in the storage 22. In another example, the electronic controller 20 holds, in advance, predetermined riding-related information of the human-powered vehicle A that is not associated with the transmission ratio. In this case, in a case where the human-powered vehicle A is in the riding convergence state and the same riding-related information as the riding-related information that is held in advance is obtained from the human-powered vehicle A and the devices related with the human-powered vehicle A, the electronic controller 20 stores the riding-related information and the shifting condition in association with each other.

The shifting condition that is associated with the riding-related information of the human-powered vehicle A is used as follows. In a case where the human-powered vehicle A enters the riding convergence state while traveling and the riding-related information obtained from the human-powered vehicle A and the devices related with the human-powered vehicle A is the same as the riding-related information held in the electronic controller 20, the transmission ratio is changed to the shifting condition associated with the held riding-related information. Use of the previously learned transmission ratio improves the riding comfort.

Second Embodiment

Figure 15:
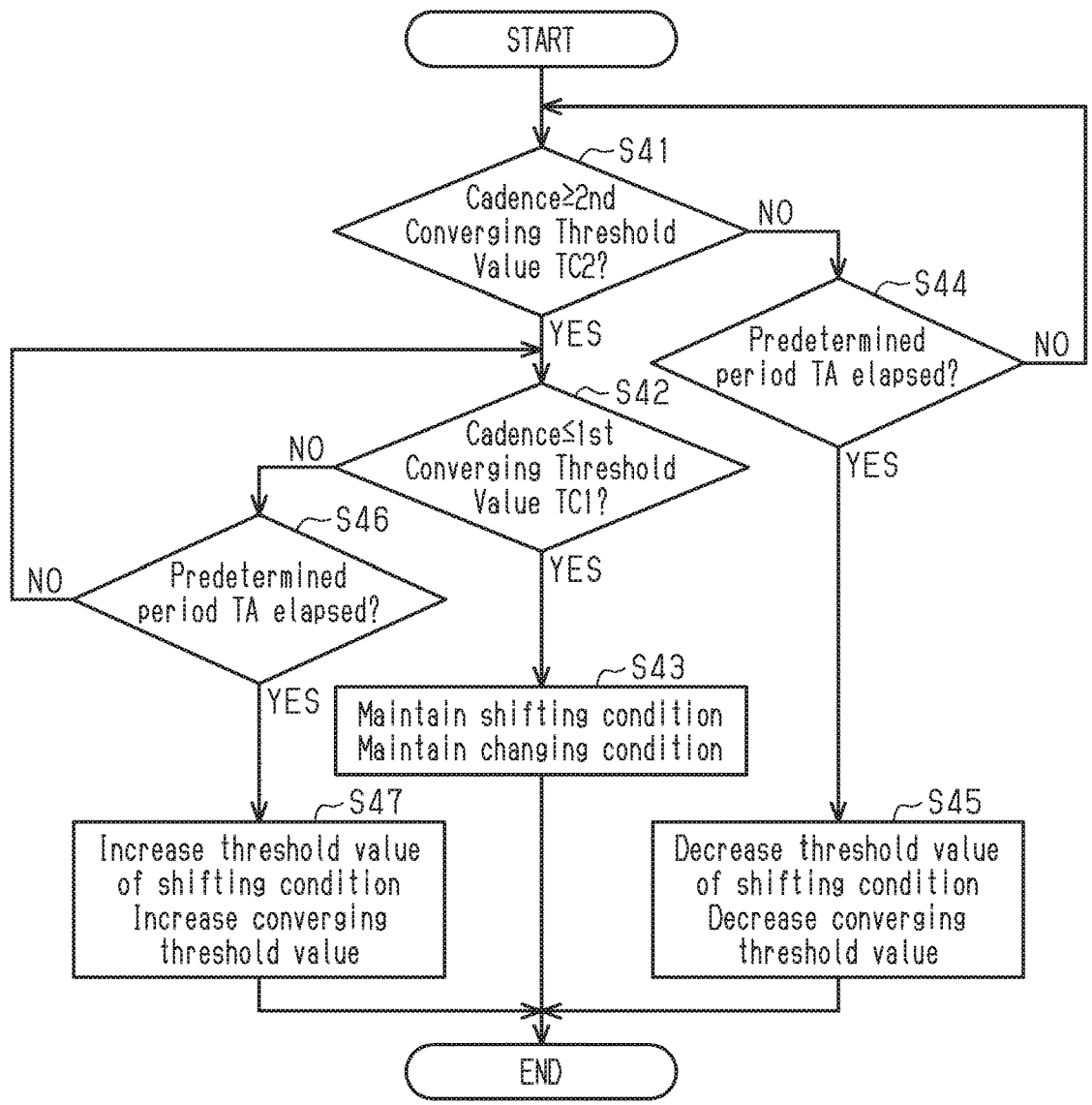
FIG. 15 is a flowchart showing an example of "shifting condition changing process" executed by the electronic controller of the control device in accordance with a second embodiment.

A second embodiment of a control device 10 will now be described with reference to FIGS. 15 and 16. The control device 10 of the first embodiment determines whether to change the shifting condition based on the converging value VC of the riding information. In the present embodiment, the control device 10 determines using a different process. The other configurations are the same as those of the control device 10 of the first embodiment. The same reference characters are given to those elements that are the same as the corresponding elements of the first embodiment. Such elements will not be described in detail.

The predetermined reference includes a predetermined reference range from which a value is taken by the riding information of the human-powered vehicle A in a case where the human-powered vehicle A is in the riding convergence state. The changing condition is in that the riding information continuously takes a value outside the predetermined reference range over a predetermined period TA in a case where the human-powered vehicle A is in the riding convergence state. In the present embodiment, the predetermined reference range is specified as a range of cadence and is defined as a range that is greater than or equal to the second converging threshold value TC2 and is less than or equal to the first converging threshold value TC1.

"The shifting condition changing process" executed by the electronic controller 20 will now be described with reference to FIG. 15. In the same manner as the first embodiment, in a case where the human-powered vehicle A is in the riding convergence state, the electronic controller 20 executes "the shifting condition changing process." The electronic controller 20 executes "the shifting condition changing process" to change the shifting condition.

In the first step S41, the electronic controller 20 determines whether cadence is greater than or equal to the second converging threshold value TC2. In a case where cadence is greater than or equal to the second converging threshold value TC2, the electronic controller 20 determines whether cadence is less than or equal to the first converging threshold value TC1 in the second step S42. In a case where cadence is less than or equal to the first converging threshold value TC1, the electronic controller 20 does not change the shifting condition and maintains the shifting condition in the third step S43. That is, in the riding convergence state of the human-powered vehicle A, in a case where the human-powered vehicle A is in the riding convergence state and cadence satisfies the predetermined reference, the electronic controller 20 maintains the shifting condition.

In the first step S41, in a case where cadence is less than the second converging threshold value TC2, whether the predetermined period TA has elapsed from a first time point at which cadence becomes less than the second converging threshold value TC2 is determined in the fourth step S44. In a case where the predetermined period TA has not elapsed, the electronic controller 20 again executes the determination of the first step S41 and executes the fourth step S44. In a case where it is determined in the fourth step S44 that the predetermined period TA has elapsed, the electronic controller 20 decreases the first threshold value TH1 and the second threshold value TH2, which are the threshold values of the shifting conditions, and also decreases the first converging threshold value TC1 and the second converging threshold value TC2 in the fifth step S45.

In the second step S42, in a case where cadence is greater than the first converging threshold value TC1, whether the predetermined period TA has elapsed from a second time point at which cadence becomes greater than the first converging threshold value TC1 is determined in the sixth step S46. In a case where the predetermined period TA has not elapsed, the electronic controller 20 again executes the determination of the second step S42 and executes the sixth step S46. Alternatively, in a case where the predetermined period TA has not elapsed, the electronic controller 20 can return to the first step S41. In the sixth step S46, in a case where it is determined that the predetermined period TA has elapsed, the electronic controller 20 increases the first threshold value TH1 and the second threshold value TH2, which are the threshold values of the shifting conditions, and also increases the first converging threshold value TC1 and the second converging threshold value TC2 in the seventh step S47.

Figure 16:
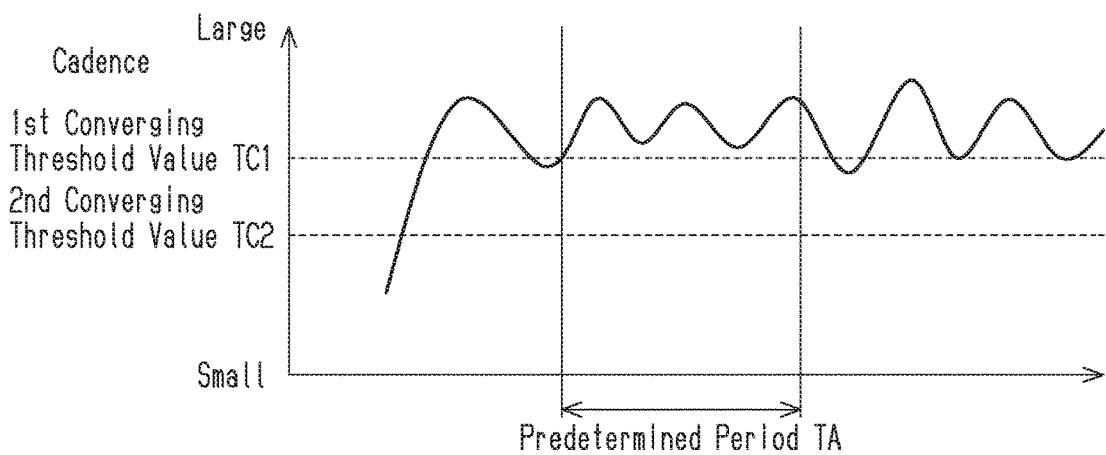
FIG. 16 is a chart showing changes in cadence in the second embodiment.

FIG. 16 is an example of changes in cadence in the riding convergence state. In this example, cadence is greater than the first converging threshold value TC1 over the predetermined period TA. In this case, the first threshold value TH1 and the second threshold value TH2, which are the threshold values of the shifting conditions, are increased, and the first converging threshold value TC1 and the second converging threshold value TC2 are also increased through the shifting condition changing process.

Third Embodiment

Figure 17:
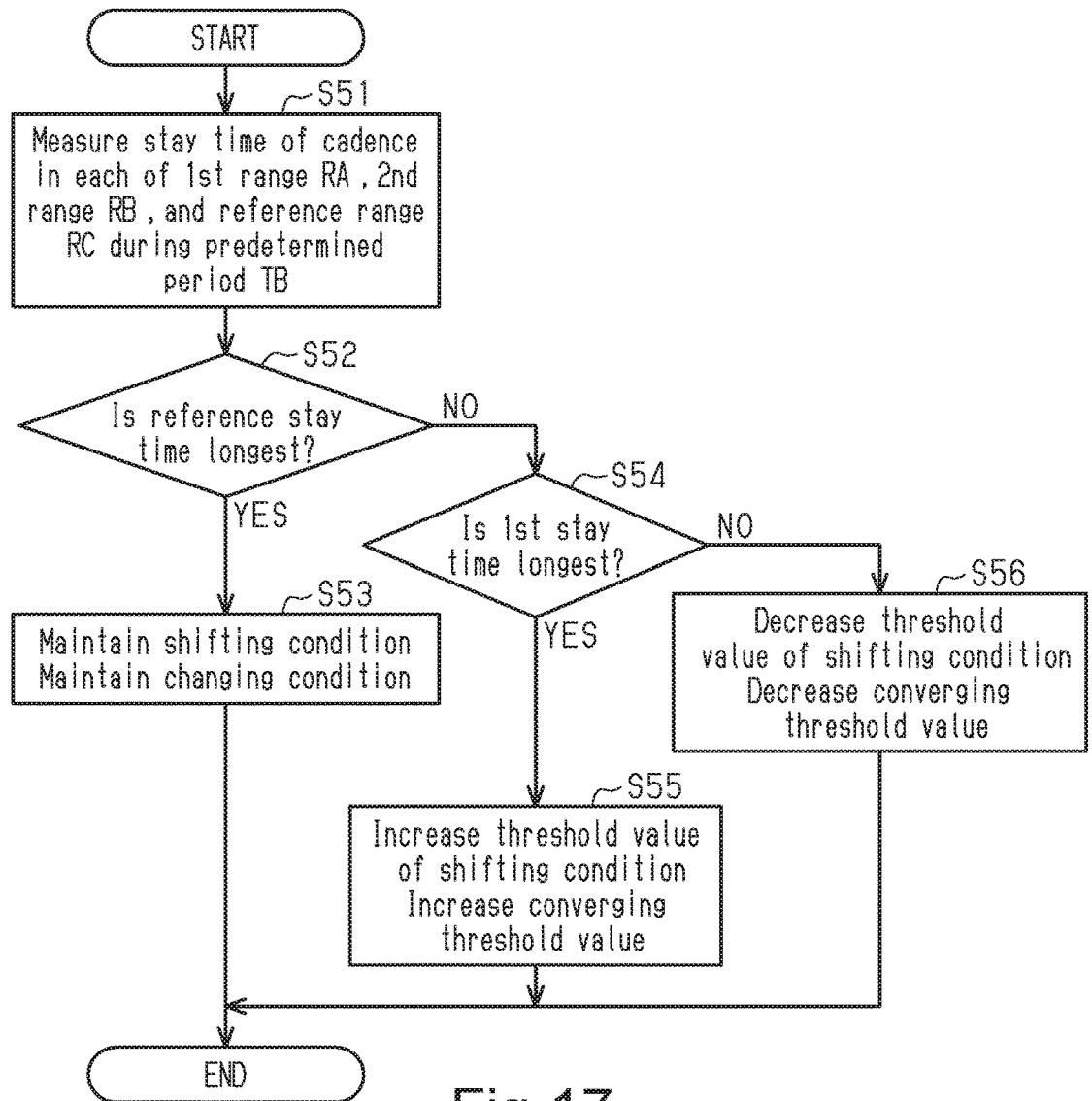
FIG. 17 is a flowchart showing an example of "shifting condition changing process" executed by the electronic controller of the control device in accordance with a third embodiment.

A third embodiment of a control device 10 will now be described with reference to FIGS. 17 and 18. The control device 10 of the first embodiment determines whether to change the shifting condition based on the converging value VC of the riding information. In the present embodiment, the control device 10 determines using a different process. The other configurations are the same as those of the control device 10 of the first embodiment. The same reference characters are given to those elements that are the same as the corresponding elements of the first embodiment. Such elements will not be described in detail.

The predetermined reference includes a predetermined reference range RC from which a value is taken by the riding information of the human-powered vehicle A in a case where the human-powered vehicle A is in the riding convergence state. The changing condition is in that in a case where the human-powered vehicle A is in the riding convergence state, a length of time in which the riding information takes a value outside the predetermined reference range RC during a predetermined period is greater than a length of time in which the riding information takes a value inside the predetermined reference range RC. In the present embodiment, the predetermined reference range RC is specified as a range of cadence and is defined as a range that is greater than or equal to the second converging threshold value TC2 and is less than or equal to the first converging threshold value TC1.

"The shifting condition changing process" executed by the electronic controller 20 will now be described with reference to FIG. 17. As described above, in a case where the human-powered vehicle A is in the riding convergence state, the electronic controller 20 executes "the shifting condition changing process." The electronic controller 20 executes "the shifting condition changing process" to change the shifting condition.

The electronic controller 20 has the predetermined reference range RC, a first range RA that takes a value greater than the predetermined reference range RC, and a second range RB that takes a value less than the predetermined reference range RC for cadence. The predetermined reference range RC is greater than or equal to the second converging threshold value TC2 and is less than or equal to the first converging threshold value TC1. The first range RA includes values greater than the first converging threshold value TC1. The second range RB includes values less than the second converging threshold value TC2.

In the first step S51, over a predetermined period TB, the electronic controller 20 measures a stay time of cadence in each of the first range RA, the second range RB, and the predetermined reference range RC. Each stay time is reset to zero after the predetermined period TB elapses. The stay time indicates the total time for which cadence takes values in the corresponding range. A first stay time indicates the total time for which cadence stays in the first range RA during the predetermined period TB. A second stay time indicates the total time for which cadence stays in the second range RB during the predetermined period TB. A reference stay time indicates the total time for which cadence stays in the predetermined reference range RC during the predetermined period TB.

In the second step S52, the electronic controller 20 determines whether the predetermined reference stay time is the longest. In a case where the predetermined reference stay time is the longest, the electronic controller 20 maintains the shifting condition and the changing condition in the third step S53.

In the second step S52, in a case where the predetermined reference stay time is not the longest, the electronic controller 20 determines whether the first stay time is the longest in the fourth step S54. In a case where the first stay time is the longest, the electronic controller 20 increases the first threshold value TH1 and the second threshold value TH2, which are the threshold values of the shifting conditions, and also increases the first converging threshold value TC1 and the second converging threshold value TC2 in the fifth step S55.

In the fourth step S54, in a case where the first stay time is not the longest, the electronic controller 20 decreases the first threshold value TH1 and the second threshold value TH2, which are the threshold values of the shifting conditions, and also decreases the first converging threshold value TC1 and the second converging threshold value TC2 in the sixth step S56.

Figure 18:
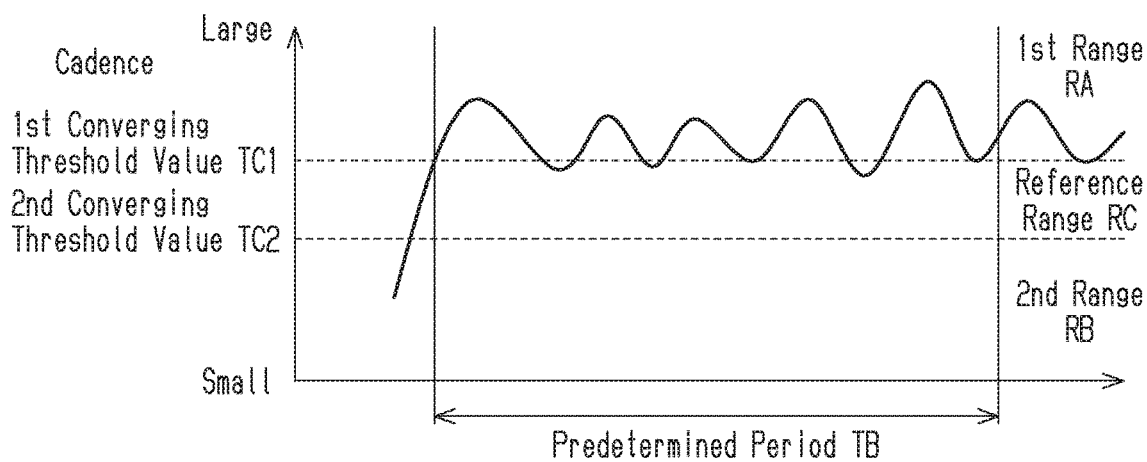
FIG. 18 is a chart showing changes in cadence in the third embodiment.

FIG. 18 is an example of changes in cadence in the riding convergence state. In this example, the first stay time, for which cadence stays in the first range RA, is the longest. The first threshold value TH1 and the second threshold value TH2, which are the threshold values of the shifting conditions, are increased, and the first converging threshold value TC1 and the second converging threshold value TC2 are also increased through the shifting condition changing process.

Modifications

The description related to the above embodiments exemplifies, without any intention to limit, applicable forms of the control device 10 according to the present disclosure. The control device 10 according to the present disclosure can be applied to, for example, modifications of the embodiments that are described below and combinations of at least two of the modifications that do not contradict each other. In the following modifications, the same reference characters are given to those elements that are the same as the corresponding elements of the above embodiment. Such elements will not be described in detail.

In the first embodiment, in a case where the human-powered vehicle A is in the riding convergence state and cadence, which is used as the riding information, is greater than the first converging threshold value TC1, that is, the upper limit value of the predetermined reference range, the electronic controller 20 increases both the first threshold value TH1 of the second threshold value TH2 of the shifting conditions. Instead, in a case where the human-powered vehicle A is in the riding convergence state and cadence, which is used as the riding information, is greater than the first converging threshold value TC1, that is, the upper limit value of the predetermined reference range, the electronic controller 20 can change one of the first threshold value TH1 and the second threshold value TH2 of the shifting condition to a value greater than the value prior to changing.

In the embodiments, in a case where the human-powered vehicle A is in the riding convergence state and cadence, which is used as the riding information, is less than the second converging threshold value TC2, that is, the lower limit value of the predetermined reference range, the electronic controller 20 decrease both the first threshold value TH1 of the second threshold value TH2 of the shifting conditions. Instead, in a case where the human-powered vehicle A is in the riding convergence state and cadence, which is used as the riding information, is less than the second converging threshold value TC2, that is, the lower limit value of the predetermined reference range, the electronic controller 20 can change one of the first threshold value TH1 and the second threshold value TH2 of the shifting conditions to a value less than the value prior to changing.

In the embodiments, in a case where the shifting conditions are satisfied and shifting is performed, it is preferred that the electronic controller 20 temporarily increase the first threshold value TH1 of the shifting condition and temporarily decrease the second threshold value TH2. Immediately after shifting is performed, cadence varies greatly. This can cause an unintended shifting to be performed. In this regard, the shifting conditions are temporarily changed to reduce situations in which the shifting conditions are satisfied due to variations of cadence during shifting. This limits unintended continuous shifting.

In the embodiments, in a case where the shifting conditions are satisfied and shifting is performed, after the shifting, the electronic controller 20 can prohibit further shifting for a fixed period. During shifting, cadence varies greatly. This can cause an unintended shifting to be performed. In this regard, after shifting is performed, further shifting is temporarily prohibited to reduce situations in which the shifting conditions are satisfied due to variations of cadence immediately after the shifting. This limits unintended continuous shifting.

In the embodiments, the electronic controller 20 can execute intervention control in the following shifting condition. More specifically, in a case where the human-powered vehicle A is in the riding convergence state, if cadence is greatly deviated from the predetermined reference range, the electronic controller 20 increases the shifting condition. In an example, the electronic controller 20 has a first value that is added to or subtracted from a threshold value and a second value that is greater than the first value.

The following control is executed in a case where the deviation is small. In a case where cadence is greater than the first converging threshold value TC1 and the difference between cadence and the first converging threshold value TC1 is greater than or equal to a first difference, the first threshold value TH1, which is one of the shifting conditions, is increased by the first value. In a case where cadence is less than the second converging threshold value TC2 and the difference between cadence and the second converging threshold value TC2 is greater than or equal to the first difference, the second threshold value TH2, which is one of the shifting conditions, is decreased by the first value. The following control is executed in a case where the deviation is large. In a case where cadence is greater than the first converging threshold value TC1 and the difference between cadence and the first converging threshold value TC1 is greater than or equal to a second difference, the first threshold value TH1, which is one of the shifting conditions, is increased by the second value. In a case where cadence is less than the second converging threshold value TC2 and the difference between cadence and the second converging threshold value TC2 is greater than or equal to the second difference, the second threshold value TH2, which is one of the shifting conditions, is decreased by the second value.

In the first embodiment, the first converging threshold value TC1 and the second converging threshold value TC2 of the changing conditions are independent of the first threshold value TH1 and the second threshold value TH2 of the shifting conditions. The former values can be related with the latter values. For example, the first converging threshold value TC1 can be an average value of the first threshold value TH1 and the median value. The second converging threshold value TC2 can be an average value of the second threshold value TH2 and the median value. The median value is the average value of the first threshold value TH1 and the second threshold value TH2.

In the first embodiment, in a case where the changing conditions are satisfied, the shifting conditions are changed. Instead, the shifting conditions can be changed as follows. The electronic controller 20 can be connected to an operation unit and change the shifting conditions based on input information received from the operation unit.

In the first embodiment, in a case where the human-powered vehicle A is in the riding convergence state, the electronic controller 20 associates the transmission ratio, the riding-related information of the human-powered vehicle A, and the shifting conditions with each other. Instead, the association of the transmission ratio, the riding-related information of the human-powered vehicle A, and the shifting conditions can be set in advance.

In the embodiments, in a case where the human-powered vehicle A is in the riding convergence state, the electronic controller 20 can calculate a converging width of the riding information based on the riding information of the human-powered vehicle A. For example, in a case where the human-powered vehicle A is in the riding convergence state, the electronic controller 20 can calculate a converging width of cadence based on cadence. For example, the converging width is used as follows.

In an example, the electronic controller 20 controls an electric component mounted on the human-powered vehicle A. The electronic controller 20 changes a control setting related with the electric component based on the converging width of the riding information. The electric component includes at least one of the suspension and the adjustable seatpost SP. In a case where the electric component is the suspension, the electronic controller 20 controls the size of the opening of an orifice provided on a cylinder or a piston in accordance with the converging width. In a case where the electric component is the adjustable seatpost SP, the electronic controller 20 adjusts the seat height in accordance with the converging width.

In the first embodiment, the electronic controller 20 can control the electric assist unit E. In a case where the human-powered vehicle A is in the riding convergence state, the electronic controller 20 can change a control setting related with the electric assist unit E based on the converging value VC of the riding information of the human-powered vehicle A. The control setting related with the electric assist unit E includes at least one of an assist mode, an assist ratio, and a torque limit value. In an example, in a case where the human-powered vehicle A is in the riding convergence state, the electronic controller 20 adjusts the assist ratio in accordance with the converging value VC of cadence.

In the first embodiment, the riding information used for the changing conditions is the same as the riding information used for the shifting conditions. More specifically, the riding information used for the changing conditions and the riding information used for the shifting conditions are both cadence. Alternatively, the riding information used for the changing conditions can differ from the riding information used for the shifting conditions. In an example, the riding information used for the changing condition is cadence, and the riding information used for the shifting condition is torque of the crank.

The riding information used for the shifting conditions can be information specified by a number of riding information items. For example, two-dimensional information specified by cadence and torque can be used. Also, the riding information used for the changing conditions can be information specified by a number of riding information items. For example, two-dimensional information specified by cadence and torque can be used.

In the embodiments, the electronic controller 20 can use the speed stage instead of the transmission ratio. The electronic controller 20 can use values obtained by dividing the number of teeth of the front sprockets D1 by the number of teeth of the rear sprockets D2 instead of the transmission ratio. The electronic controller 20 can use values obtained by dividing the number of teeth of the rear sprockets D2 by the number of teeth of the front sprockets D1 instead of the transmission ratio.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A control device configured to control a transmission of a human-powered vehicle, the control device comprising:
   an electronic controller configured to control the transmission,
   the electronic controller being configured to actuate the transmission to shift a transmission ratio based on at least one shifting condition, and
   the electronic controller being configured to hold the at least one shifting condition that is associated with riding-related information of the human-powered vehicle upon determining the human-powered vehicle is in a riding convergence state, the riding convergence state is a state in which the cadence is substantially constant, the electronic controller being configured to hold the at least one shifting condition by accessing the at least one shifting condition in a storage that stores the at least one shifting condition, after holding the at least one shifting condition, the electronic controller being further configured to determine the at least one shifting condition to perform a shifting operation when the human-powered vehicle is in the riding convergence state, the riding-related information includes at least a cadence of the human-powered vehicle, the electronic controller increasing a threshold value of the shifting, condition if the riding-related information takes a value corresponding to a momentum that is greater than a first converging threshold value, the momentum being applied to a crank of the human-powered vehicle.

2. The control device according to claim 1, wherein the electronic controller is configured to use a first shifting condition of the at least one shifting condition for a first transmission ratio and a second shifting condition of the at least one shifting condition for a second transmission ratio, the first shifting condition differs from the second shifting condition.

3. The control device according to claim 1, wherein the electronic controller is configured to determine whether a changing condition is satisfied for changing the at least one shifting condition, and
   the changing condition is satisfied upon determining riding information of the human-powered vehicle does not satisfy a predetermined reference while the human-powered vehicle is in the riding convergence state.

4. The control device according to claim 3, wherein the electronic controller is configured to obtain the riding-related information related to a state of changing the at least one shifting condition, and to store the riding-related information and a changed in the at least one shifting condition in association with each other in storage, upon determining the changing condition is satisfied, and when changing the at least one shifting condition.

5. The control device according to claim 4, wherein the electronic controller is configured to change the at least one shifting condition prior to changing to the at least one shifting condition associated with the riding-related information, upon determining the riding-related information that is obtained from the human-powered vehicle and a device related with the human-powered vehicle matches the riding-related information obtained from the storage.

6. The control device according to claim 5, wherein the at least one shifting condition includes a plurality of shifting conditions that are stored in association with the riding-related information, the electronic controller is configured to calculate a new shifting condition based on the plurality of shifting conditions and change a current one of the plurality of shifting conditions prior to changing to the new shifting condition.

7. The control device according to claim 3, wherein the riding-related information is at least one of riding information of the human-powered vehicle, a device setting information of the human-powered vehicle, a body information of a user of the human-powered vehicle, and environment information of an environment of the human-powered vehicle.

8. The control device according to claim 3, wherein the predetermined reference includes a predetermined reference range from which a value is taken by the tiding information of the human-powered vehicle while the human-powered vehicle is in the riding convergence state, and
the changing condition is satisfied where the riding information continuously takes a value outside the predetermined reference range over a predetermined period while the human-powered vehicle is in the riding convergence state.

9. The control device according to claim 3, wherein the predetermined reference includes a predetermined reference range from which a value is taken by the riding information of the human-powered vehicle while the human-powered vehicle is in the riding convergence state, and
the changing condition is satisfied where a length of time in which the riding information takes a value outside the predetermined reference range during a predetermined period is greater than a length of time in which the riding information takes a value inside the predetermined reference range while the human-powered vehicle is in the riding convergence state.

10. The control device according to claim 3, wherein the at least one shifting condition includes a first threshold value for the riding information of the human-powered vehicle and a second threshold value that is lower than the first threshold value.

11. The control device according to claim 3, wherein the riding information used for the changing condition is the same as the riding information used for the at least one shifting condition.

12. The control device according to claim 3, wherein the riding information used for the changing condition differs from the riding information used for the at least one shifting condition.

13. The control device according to claim 3, wherein the riding information further includes at least one of, a torque of a crank, a vehicle speed, and an acceleration.

14. The control device according to claim 1, wherein the electronic controller is connected to an operation unit, and configured to change the at least one shifting condition based on input information received from the operation unit.

15. A control device configured to control a transmission of a human-powered vehicle, the control device comprising:
an electronic controller configured to control the transmission,
the electronic controller being configured to actuate the transmission to shift a transmission ratio based on at least one shifting condition, and
the electronic controller being configured to hold the at least one shifting condition that is associated with riding-related information of the human-powered vehicle upon determining the human-powered vehicle is in a riding convergence state,
the electronic controller is configured to determine whether a changing condition is satisfied for changing the at least one shifting condition, and
the changing condition is satisfied upon determining riding information of the human-powered vehicle does not satisfy a predetermined reference while the human-powered vehicle is in the riding convergence state,
the predetermined reference including a predetermined reference range from which a value is taken by the riding information of the human-powered vehicle while the human-powered vehicle is in the riding convergence state; and
the electronic controller being further configured to change the at least one shifting condition to increase a median value of the at least one shifting condition if the riding information takes a value corresponding to a momentum that is greater than a momentum corresponding to a state where the riding information is in the predetermined reference range while the human-powered vehicle is in the riding convergence state, and
the electronic controller being further configured to change the at least one shifting condition to decrease the median value of the at least one shifting condition if the riding information takes a value corresponding to a momentum that is less than a momentum corresponding to a state where the riding information is in the predetermined range.

16. A control device configured to control a transmission of a human-powered vehicle, the control device comprising:
an electronic controller configured to control the transmission,
the electronic controller being configured to actuate the transmission to shift a transmission ratio based on at least one shifting condition, and
the electronic controller being configured to hold the at least one shifting condition that is associated with riding-related information of the human-powered vehicle upon determining the human-powered vehicle is in a riding convergence state,
the electronic controller is configured to determine whether a changing condition is satisfied for changing the at least one shifting condition, and
the changing condition is satisfied upon determining riding information of the human-powered-vehicle does not satisfy a predetermined reference while the human-powered vehicle is in the riding convergence state,
the electronic controller being further configured to calculate a converging width of the tiding information based on the riding information of the human-powered vehicle while the human-powered vehicle is in the riding convergence state.

17. The control device according to claim 15, wherein the electronic controller is configured to control art electric component mounted on the human-powered vehicle, and
the electronic controller is configured to change a control setting related with the electric component based on a converging width of the riding information.

18. The control device according to claim 17, wherein the electric component includes at least one of a suspension and an adjustable seatpost.

19. A control device configured to control a transmission of a human-powered vehicle, the control device comprising:
an electronic controller configured to control the transmission, the electronic controller being configured to actuate the transmission to shift a transmission ratio based on at least one shifting condition, and the electronic controller being configured to hold the at least one shifting condition that is associated with riding-related information of the human-powered vehicle upon determining the human-powered vehicle is in a riding convergence state, the electronic controller is configured to determine whether a changing condition is satisfied for changing the at least one shifting condition, and the changing condition is satisfied upon determining riding information of the human-powered vehicle does not satisfy a predetermined reference while the human-powered vehicle is in the riding convergence state, the electronic controller being further configured to control an electric assist unit, and the electronic controller being further configured to change a control setting related with the electric assist unit based on a converging value of the riding information of the human-powered vehicle in while the human-powered vehicle is in the riding convergence state.

20. The control device according to claim 19, wherein the control setting related with the electric assist unit includes at least one of an assist mode, an assist ratio, and a torque limit value.

* * * * *